(12) United States Patent
Levitsky et al.

(10) Patent No.: US 9,760,667 B1
(45) Date of Patent: Sep. 12, 2017

(54) METHOD, SYSTEM, AND COMPUTER PROGRAM PRODUCT FOR IMPLEMENTING PROTOTYPING AND FLOORPLANNING OF ELECTRONIC CIRCUIT DESIGNS

(71) Applicant: Cadence Design Systems, Inc., San Jose, CA (US)

(72) Inventors: Oleg Levitsky, San Jose, CA (US); Paul W. Kollaritsch, Marco Island, FL (US)

(73) Assignee: Cadence Design Systems, Inc., San Jose, CA (US)

( * ) Notice: Subject to any disclaimer, the term of this patent is extended or adjusted under 35 U.S.C. 154(b) by 46 days.

(21) Appl. No.: 14/320,444

(22) Filed: Jun. 30, 2014

(51) Int. Cl.
*G06F 17/50* (2006.01)

(52) U.S. Cl.
CPC .................. *G06F 17/5059* (2013.01)

(58) Field of Classification Search
USPC .......................................................... 716/113
See application file for complete search history.

(56) References Cited

U.S. PATENT DOCUMENTS

| | | |
|---|---|---|
| 6,496,972 B1 | 12/2002 | Segal |
| 6,874,135 B2 | 3/2005 | Gupta et al. |
| 7,380,233 B2 | 5/2008 | Bickford et al. |
| 7,603,643 B2 | 10/2009 | McCracken et al. |
| 7,802,215 B2 | 9/2010 | Reddy et al. |
| 8,095,898 B1 | 1/2012 | Wu et al. |
| 8,122,398 B2 | 2/2012 | Veller et al. |
| 8,181,145 B2 | 5/2012 | Rice |
| 8,707,228 B1 | 4/2014 | Kollaritsch et al. |
| 8,719,743 B1 | 5/2014 | Kollaritsch et al. |
| 2003/0237067 A1 | 12/2003 | Mielke |
| 2006/0031699 A1 | 2/2006 | Arthanari et al. |
| 2006/0053395 A1 | 3/2006 | Lai et al. |
| 2006/0225005 A1* | 10/2006 | Correale, Jr. ....... G06F 17/5068 716/113 |

(Continued)

OTHER PUBLICATIONS

Hierarchical Scan Synthesis Methodology Using Test Models, Synopsys, Oct. 2001, 8 Pages.

(Continued)

*Primary Examiner* — Mohammed Alam
(74) *Attorney, Agent, or Firm* — Vista IP Law Group, LLP

(57) ABSTRACT

Methods and systems for implementing prototyping and floorplanning for electronic circuit designs are disclosed. The method identifies or generates a representation of a design, modifies or updates the representation by moving a circuit component in the representation. The representation may be characterized in the pre-placement or post-placement stage to determine or identify distance constraints constraining object pairs in the representation. The method performs a timing and/or congestion analysis with distance-based timing information having a spatial dimension rather than timing information having a temporal dimension for the representation of the electronic design. The timing and/or congestion analysis is performed during the circuit component is being moved or shortly after the circuit component has been moved. The results of the timing and/or congestion analysis are provided in an interactive manner or in a batch mode.

28 Claims, 15 Drawing Sheets

(56) References Cited

U.S. PATENT DOCUMENTS

| | | | |
|---|---|---|---|
| 2007/0220466 A1* | 9/2007 | Davidovic | G06F 17/5031 716/114 |
| 2007/0277144 A1 | 11/2007 | Veller | |
| 2009/0013298 A1 | 1/2009 | Fouad | |
| 2009/0125859 A1* | 5/2009 | Alpert | G06F 17/5031 716/125 |
| 2009/0178013 A1* | 7/2009 | Wang | G06F 17/5045 716/132 |
| 2009/0210840 A1 | 8/2009 | Berry et al. | |
| 2009/0259979 A1* | 10/2009 | Smith | G06F 17/5031 716/113 |
| 2011/0107291 A1* | 5/2011 | Barwin | G06F 17/5031 716/134 |
| 2012/0124534 A1 | 5/2012 | Kalafala | |
| 2013/0055187 A1* | 2/2013 | Hiromitsu | G06F 17/5072 716/122 |
| 2013/0061193 A1 | 3/2013 | Lasher et al. | |
| 2013/0179854 A1* | 7/2013 | Kojima | G06F 17/5036 716/134 |
| 2013/0326455 A1* | 12/2013 | Alpert | G06F 17/5072 716/122 |

OTHER PUBLICATIONS

Non-Final Office Action dated Jul. 31, 2012 for U.S. Appl. No. 13/097,818.
Final Office Action dated Jan. 10, 2013 for U.S. Appl. No. 13/097,818.
Non-Final Office Action dated Jul. 12, 2013 for U.S. Appl. No. 13/097,818.
Non-Final Office Action dated Aug. 6, 2013 for U.S. Appl. No. 13/632,138.
Notice of Allowance dated Nov. 22, 2013 for U.S. Appl. No. 13/097,818.
Notice of Allowance dated Dec. 13, 2013 for U.S. Appl. No. 13/632,138.

* cited by examiner

METHOD, SYSTEM, AND COMPUTER PROGRAM PRODUCT FOR IMPLEMENTING PROTOTYPING AND FLOORPLANNING OF ELECTRONIC CIRCUIT DESIGNS

CROSS REFERENCE TO RELATED APPLICATION(S)

This application is related to U.S. patent application Ser. No. 13/097,818, now U.S. Pat. No. 8,707,228 entitled "METHOD AND SYSTEM FOR IMPLEMENTING HIERARCHICAL PROTOTYPING OF ELECTRONIC DESIGNS" and filed on Apr. 29, 2011. The content of the aforementioned U.S. patent is hereby expressly incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

As electronic designs become more and more complex with very little or no room for silicon recall due to prohibitive cost, designers tend to spend much time during the early design stages doing prototyping and floorplanning by, for example, performing various what-if analyses and/or manual adjustment during the floorplanning stage. When performing the what-if analyses or manual floorplan adjustments, a designer may spend a significant amount of time awaiting the results of each floorplan iteration. For example, a designer may identify a critical path that fails to meet the available slack for the path and thus need to move one or more instances connected by the path to satisfy the timing requirements. The design in this case may need to calculate the new distance after moving the one or more instances, check whether moving the one or more instances does not create additional critical path(s). The designer may often need to run additional timing commands due to the unavailability of timing information for these paths that are made critical due to the moving of the one or more instances. Once the timing or slack information or data for these additional path(s) is determined, the designer may need to determine whether one or more other components or models in the same electronic design may need to be moved to make sure that no additional paths violate the timing requirements due to the designer's moving the one or more instances in the floorplan. The designer may encounter similar issues at this stage due to the lack of timing information for one or more paths connecting these one or more other components or models. Consequently, a designer may spend up to 70% of the total design cycle time and days or even weeks during the prototyping and floorplanning stage.

Therefore, there exists a need for effective and efficient techniques for prototyping and floorplanning of electronic designs.

SUMMARY

Disclosed are method(s), system(s), and article(s) of manufacture for prototyping and floorplanning electronic circuit designs in one or more embodiments. Some embodiments are directed at a method for prototyping and floorplanning electronic circuit designs. In some of these embodiments, the method may identify (if already existing) or generate (if non-existing) a representation of an electronic design for analysis and execute one or more scripted or non-scripted analyses by modifying or updating the representation of the electronic design by adding a new circuit component to, removing an existing circuit component from, or modifying an existing circuit component in the representation. One or more first timing and/or congestion analyses may be performed for the representation with distance-based timing information including timing data or timing constraints having a spatial dimension, instead of a temporal dimension.

In some of these embodiments, the representation and/or the electronic design for the one or more first timing and/or congestion analyses does not include timing information or timing data. The performance of the one or more timing and/or congestion analyses may be performed during or after modifying or updating the representation of the electronic design in a substantially real-time or in a batch mode. The method may further generate and provide the generated results for the one or more first timing analysis. In some embodiments, the method may reduce the size of the electronic design to generate a more abstracted version of the electronic design to create the representation by using one or more model reduction techniques. The method or system may further optionally perform placement or floorplanning to place at least some component models in the representation of the electronic design. The one or more component models may include one or more flexmodels of designs or one or more gate level designs of one or more corresponding circuit components in some embodiments.

The results for the one or more first timing and/or congestion analyses may be generated and provided to, for example, a user interactively while the circuit component is being added to, removed from, or modified in the representation. In addition or in the alternative, the results for the one or more first timing and/or congestion analyses may be generated and provided in a batch mode. The method may further characterize the representation of the electronic design and identify or determine a correlation or mapping between timing information having a temporal dimension and the distance-based timing information having a spatial dimension in some embodiments. In some of these embodiments, the method may characterize the representation by at least identifying an component pair including a first component model and a second component model in the representation and identifying or determining a first path between the first component model and the second component model based at least in part upon the timing information associated with the first path.

The first path may be identified from a set of paths when the first path is associated with the smallest available slack among the set of paths, and the timing information associated with the first path may thus include the smallest available slack for the first path. When characterizing the representation, the method may further generate or update a distance-based timing graph for the electronic design, wherein the distance-based timing graph includes a first node representing the first component, a second node representing the second component model, and a first edge representing the first path, the first edge in the distance-based timing graph is associated with a distance value between the first component model and the second component value, and the distance value is derived from the timing information having the temporal dimension using the correlation or mapping. In some of these embodiments, the distance value may be derived from the timing information based at least in part upon a first internal distance margin of the first component model and/or a second internal distance margin of the second component model.

In charactering the representation, the method may further identify or determine a maximum allowable distance for constraining the first path based at least in part upon the timing information associated with the first path. In some of these embodiments where the maximum allowable distance is identified or determined, the method may identify a first register in the first component model and a second register in a second component model and identify or create a first bounding box for the first component model and a second bounding box for the second component model. The maximum allowable distance may be identified or determined based further at least in part upon a first area of the first component model or the first bounding box and/or a second area of the second component model or the second bounding box in some of these embodiments.

In characterizing a representation of an electronic design, the method may further determine whether or not the first path passes through a third component model including combination logic block or a block of sequential gates, determine whether or not the first component model and the second component model is connected with a second path that does not pass through the third component model, and determine whether or not the first path is to be replaced with the second path based at least in part upon a first length of the first path through the third component model and the second length of the second path. In addition or in the alternative, the method may determine whether or not the first path passes through a register that is situated at a same hierarchical level as the first component model and the second component model and determine whether or not the register is fixed in the representation in some embodiments. In some of these embodiments, the method may further retime the first path by moving the register when the register is determined not to be fixed in the representation and treat the register as a third component model including a combinational logic block or a block of sequential gates for the first timing and/or congestion analysis.

The method for prototyping or floorplanning electronic designs may further identify or determine routing information for the representation, wherein the routing information includes global route information, C-route information, or detail route information for at least a portion of the representation. The method may further update the distance-based timing information with the routing information and perform a second timing and/or congestion analysis with the distance-based timing information for the electronic design and the routing information.

Some embodiments are directed at a hardware module or system that may be invoked to perform any of the methods, processes, or sub-processes disclosed herein. The hardware system may include one or more hardware modules that by themselves or in conjunction with one or more other hardware components, one or more software modules, or a combination of one or more hardware components and one or more software modules of one or more computing systems to execute a sequence of instruction to perform model reduction for electronic designs, to determine or identify one or more spatial-temporal correlations or mappings, to performing timing and/or congestion analyses, to perform interactive analyses, and/or to perform prototyping or floorplanning for electronic designs. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for prototyping and floorplanning electronic circuit designs are described below with reference to FIGS. 1-8.

BRIEF DESCRIPTION OF THE DRAWINGS

The drawings illustrate the design and utility of various embodiments of the invention. It should be noted that the figures are not drawn to scale and that elements of similar structures or functions are represented by reference numerals throughout the figures. In order to better appreciate how to obtain the above-recited and other advantages and objects of various embodiments of the invention, a more detailed description of various embodiments briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for prototyping and floorplanning electronic circuit designs. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of various embodiments described herein. Where certain elements of some embodiments may be partially or fully implemented using known components (or methods or processes), only those portions of such known components (or methods or processes) that are necessary for an understanding of various described embodiments will be described, and the detailed descriptions of other portions of such known components (or methods or processes) will be omitted so as not to obscure the invention. Further, various embodiments encompass present and future known equivalents to the components referred to herein by way of illustration.

Figure 1:
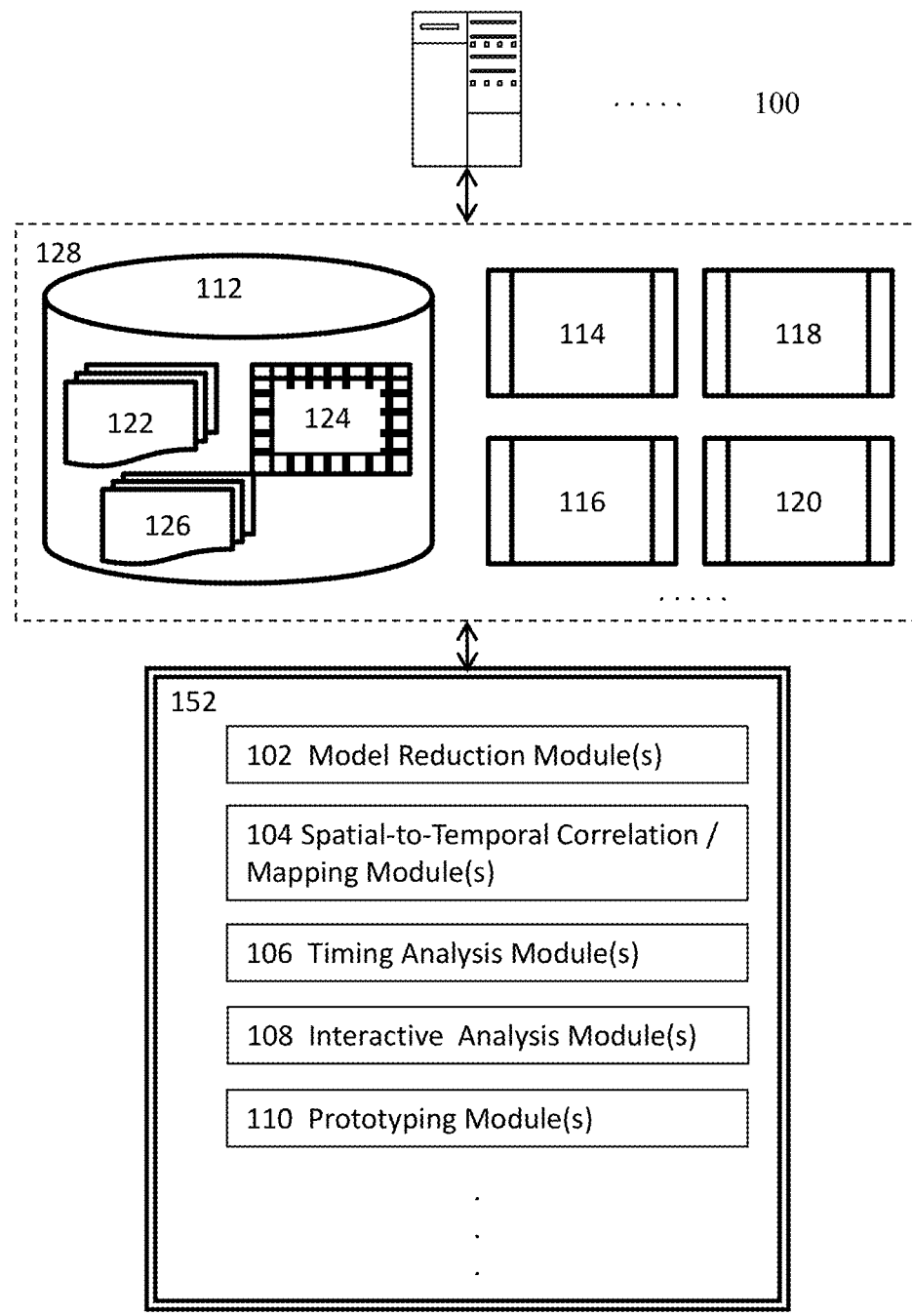
FIG. 1 illustrate a illustrative high level schematic block diagrams for a system for prototyping and floorplanning electronic circuit designs in some embodiments.

Disclosed are method(s), system(s), and article(s) of manufacture for prototyping and floorplanning electronic circuit designs in one or more embodiments. FIG. 1 illustrates a high level schematic block diagrams for implementing prototyping and floorplanning for electronic designs. In one or more embodiments, the method or system for implementing prototyping and floorplanning for electronic designs illustrated in FIG. 1 may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a placement tool, a global routing engine, a C-routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, various timing constraints in a temporal dimension, various timing constraints in a spatial dimension, data or data structures including the correlation or mapping between temporal timing constraints or requirements and spatial, distance-based timing constraints or requirements, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more model reduction modules 102 to reduce the size of an electronic design while providing sufficient information for various other processes or modules to perform their respective functions as described in this application, one or more spatial-to-temporal timing information correlation or mapping modules 104 to identify or determine the correlation or mapping between timing information or constraints (e.g., slack values) in the temporal dimension and timing information or constraints in the spatial dimension (e.g., distance-based timing information or timing constraints such as distances corresponding to the slack values), one or more timing analysis modules 106 such as a static timing analysis (STA) module or a statistical static timing analysis (SSTA) module to determine whether timing constraints are satisfied and/or to generate timing analysis results, one or more interactive analysis modules 108 that work alone or in conjunction with one or more other processes or modules to present various analysis results in an interactive manner or in a batch mode, and one or more prototyping modules 110 to perform various prototyping tasks, analyses such as what-if analyses or corner analyses, or any combinations thereof.

In some embodiments, the spatial-to-temporal correlation or mapping modules 104 may function as follows. These modules 104 may characterize the electronic design or a portion thereof by identifying or calculating the slack values for an electronic design or a portion thereof. With the slack values identified or calculated, these modules 104 may thus identify a net or a net segment associated with the smallest available slack regardless of whether or not the actual, physical design for the net or the net segment actually exists.

In some embodiments where the electronic design is undergoing the floorplanning or placement stage, the actual, physical design of the nets may not be created yet. Rather, the electronic design may contain only some intellectual property blocks, macros, or cells with no interconnects in between. In some of these embodiments, even these cells, macros, or blocks may not even have finally fixed locations in the layout yet. Instead, some of these cells, macros, or blocks may be moved in the layout for floorplanning or placement purposes.

In some embodiments, the final locations of various cells, blocks, and/or macros may not be finalized during the floorplanning or placement stage to which various embodiments described herein also apply with full and equal effects. In these embodiments where the actual locations of or the interconnections between cells, blocks, or macros are not finally determined, These modules 104 may nevertheless identify, for example, the Manhattan distance between two modules (e.g., between two blocks, cells, macros, or any combinations thereof) that are associated with the smallest available slack. These modules 104 may then use the identified smallest allowable slack value and the identified Manhattan distance between the two modules to determine the spatial-to-temporal correlation.

For example, These modules 104 may determine that a net (which has not been designed or created in the layout of an electronic design) connecting two blocks is associated with the smallest allowable slack value of 10-nanoseconds, and the Manhattan distance between these two blocks is 100-micrometers. These modules 104 may thus determine the spatial-to-temporal correlation to be 10-micrometers/nanosecond for at least a portion of the electronic design of interest. As the physical implementation of the electronic design progresses further to produce more physical data, These modules 104 may further use the more accurate physical data (e.g., actual interconnect designs) to fine tune the spatial-to-temporal correlation in some embodiments. Rather than using the methodologies described immediately above, the spatial-to-temporal correlation or mapping may also be identified (e.g., by using one or more look-up or heuristics tables, databases, or other types of data structures) from one or more other structurally or functionally similar electronic designs in some embodiments.

Figure 2:
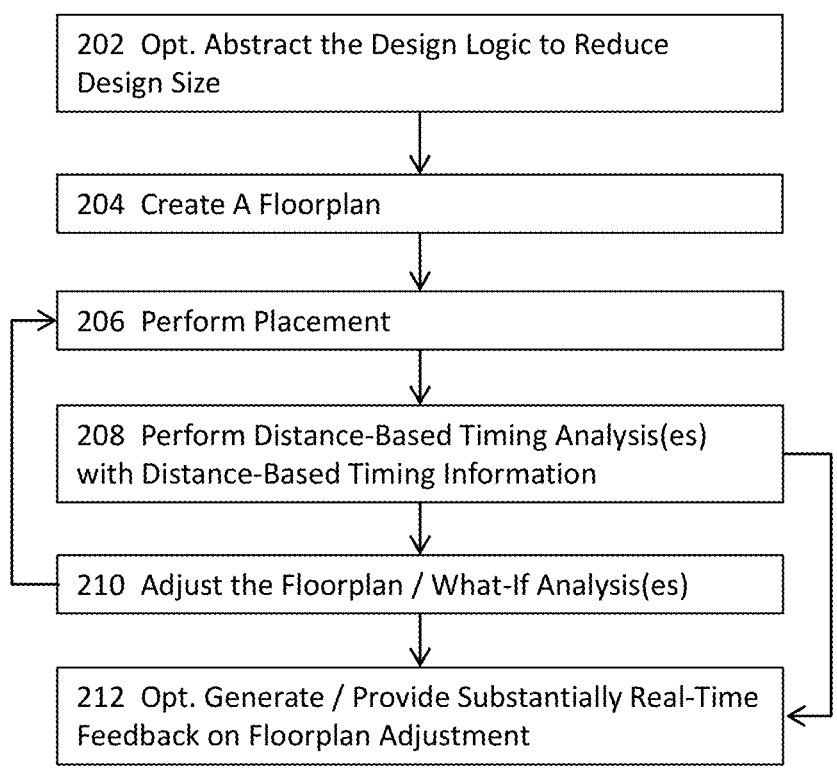
FIG. 2 illustrates a high level block diagram for a method or system for prototyping and floorplanning electronic circuit designs in some embodiments.

FIG. 2 illustrates a high level block diagram for a method or system for implementing prototyping and floorplanning for electronic circuit designs in some embodiments. In these embodiments illustrated in FIG. 2, the method or system may optionally abstract the electronic design or identify an abstracted version of the electronic design in order to handle the electronic design of interest with a reduced size. In some of these embodiments, the method or system may invoke or execute the one or more model reduction or abstraction modules 102 to abstract at least a portion of the electronic design of interest to reduce the size of the electronic design at 202. During the prototyping or floorplanning stage, designers may not need all the details of an electronic design and thus may apply various model reduction techniques to reduce the size of an electronic design of interest. In some embodiments, the electronic design may be reduced to include the gate-level components. In some other embodiments illustrated in FIG. 2, the method or system may use one or more flexible abstraction models to represent the at least a portion of the electronic design to reduce the size of the electronic design of interest.

A flexible abstraction model ("flexmodel" hereinafter) includes an abstraction of a circuit portion that allows for very efficient analysis of electronic designs. The flexmodel replaces a substantial portion of the internal paths of a circuit portion with a model that significantly reduced in size so that the prototype circuit design is much smaller than the entirety of the original circuit, which allows for very efficient analysis. One way to accomplish this is to remove internal R-to-R (register to register) paths and replace those paths with flexible filler cells, which may be implemented as a type of standard cells having specified connection and behavioral parameters appropriate as nonfunctional filler cells. In this manner, the flex model would remove all internal paths while it maintains paths that extend to input and output ports, the interface paths.

In addition, optimizations can be performed for all (or substantially all) of the interface paths, so that there is confidence at the top level that the models will accurately reflect the best possible timing (and physical characteristics) and so that the designer can analyze if a floorplan can be made such that the circuit design will be acceptable for its intended functionality. This may be implemented by taking all (or at least a substantially large number) of the timing paths, and optimizing those paths, instead of just identifying just a select few critical paths. This can be accomplished by setting the input and output delays for each flex model so that they are extremely small, which essentially means that a negative delay is established for those input/outputs for the models. For each flex model, interface paths are then optimized as much as possible/reasonable to meet these aggressive timing requirements. In this way, there is great confidence that the timing of this model will be as good as it may possibly be, so that when the analysis is performed at the top-level of the design, the remedy is changing the top-level floorplan, and not improving the models. On the other hand, if the timing requirements cannot be met, then this issue can be identified early enough so that the designer can more easily correct the problem. In this way, the invention provides very good visibility into the timing behavior of the circuit design, in a curate manner, at an early stage of the design cycle. More details about flexmodels are described in U.S. Pat. No. 8,707,228, the content of which is hereby expressly incorporated by reference in its entirety for all purposes.

At 204, a floorplan for the electronic design may be created or identified. In some embodiments illustrated in FIG. 2, the floorplan may or may not have been run through the placement engine to place all the components (e.g., macros, intellectual property or IP blocks, etc.) In other words, various techniques described herein do not require a post-placement electronic design to perform their functions so as to accomplish the purposes described herein, although various techniques described herein also work with a fully placed electronic design. The resulting electronic design of 204 may or may not include any global routes, trial routes, or detail routes. In some embodiments where some routing information (e.g., a global route, a trial route, or a detail route) is available, various processes may use such routing information although routing information is not required for these processes or modules illustrated in FIG. 2 to perform their functions.

At 206, some placement may be performed either automatically (e.g., with an automated placement tool) or manually (e.g., by a designer via an electronic design automation tool) such that the method or system may have some circuit design components to start with. The method or system may then perform one or more distance-based timing analyses at 208 for the electronic design to determine whether or not the electronic design meets the timing requirements or constraints (hereinafter "constraint" or "constraints"). In some embodiments, the one or more timing analyses include the distance-based, rather than time-based timing analysis (e.g., analysis based on delays, slacks, skews, etc.) That is, the distance-based timing analysis uses distances or distance constraints having a spatial dimension instead of timing information or timing constraints having the temporal dimension in some embodiments.

As described previously with reference to 204, the electronic design may or may not include routing information. Nonetheless, if routing information is available, the method or system may use such routing information. For example, if a trial route is available in the electronic design, process 208 may use the trial route to determine the distance between two circuit components in the electronic design. In the embodiments where no routing information is available, the method or system considers the intrinsic gate delays and ignores routing delays. More details about the distance-based timing analysis will be described below. Delays may include the intrinsic gate delays and routing delays (or net delays). The routing or net delay of a net is the time-of-flight due to the resistance(s) and capacitance(s) of the net. In a routed electronic design, the resistances and capacitances may be extracted from the layout of the electronic design.

On the other hand, the wire load model may be used to determine or derive the resistance(s) and capacitance(s) of a net in a pre-layout stage where no routing information is available. The electronic design may be adjusted, or one or more what-if analyses may be performed at 210 based at least in part upon the results of the one or more distance-based timing analyses obtained at 208. For example, a designer may move one or more circuit components in the electronic design to examine the effects of moving these one or more circuit components for one or more what-if analyses. The adjustment may be performed automatically by the electronic design automation tool or manually by the designer either individually or in one or more batches.

In a distance-based timing analysis for two circuit components having one or more paths in between, the method or system identifies the path that has the minimum or smallest available slack between the two circuit components and identifies the distance corresponding to the minimum or smallest available slack. The slack of a net may be defined as the required arrival time at a pin of a gate minus the actual arrival time at the pin of a gate. Therefore, a positive slack indicates that the data or signal arrives at the pin of a gate before it is required, and a negative slack value indicates that the data or signal arrives at the pin of a gate after it is required. Another facet of slack is that the slack includes the temporal margin by which a timing requirement is satisfied or not satisfied. In this context, a positive slack indicates the margin by which the timing requirement is satisfied, and a negative slack indicates the margin by which the timing requirement is not satisfied.

In some embodiments, the method or system perform various actions described in this application to maintain non-negative slacks for the nets of interest and generate warnings when a negative slack is encountered. In addition or in the alternative, the method or system may perform various actions described in this application to increase negative slacks to or to decrease some positive slack values to some smaller, non-negative slack values. The two circuit components may then be bounded by that distance during the adjustment of the electronic design at 210 and/or the performance of the one or more distance-based analyses at 208 while the method or system iterates to maintain the slack values of the paths to be a non-negative value.

If there exist more than one path between the two components, the non-selected paths between these two circuit components will automatically satisfy the timing requirements (e.g., non-negative slack values for all paths) when the path having the smallest available slack is selected and converted into the corresponding distance value to limit how far apart the two circuit components may be moved. For example, an available slack value of 10-ns into a, for example, 100-micrometer distance value. One of the advantages of using the distance-based timing analysis as described herein is that the path available slack does not depend on the actual slack and may be calculated in a pre-placement mode. Therefore, using the distance-based timing analysis provides greater flexibility and more complete timing information in early stages of the electronic design. Another advantage of using the distance-based timing analysis as described herein is that delay or slew propagation may be ignored during the timing analyses, unlike conventional timing analyses.

After the electronic design has been adjusted or while the electronic design is being adjusted, the method or system may return to 206 to perform placement based at least in part upon the moved one or more circuit components and repeat the distance-based timing analysis at 208 to generate updated or additional timing information. The method or system may thus iteratively perform the operations in 206-210 until a stop criterion has been reached (e.g., convergence in the results or a prescribed number of iterations, etc.) for the one or more distance-based timing analyses. At 212, the method or system may optionally generate and/or provide feedback on the adjustment of the electronic design. In some of the illustrated embodiments, the method or system may generate and/or provide feedback in a substantially real-time manner.

A real-time feedback includes one that is generated by process 210 that matches or proceeds at the same rate as the designer's perception of time. Nonetheless, it is well known that any process (e.g., placement of one or more circuit components, operations in the distance-based timing analyses, generating or providing feedback in a user interface, etc.) executing on a computing system requires a certain period of time to complete. Therefore, the method or system generates and/or provides the feedback in substantially real-time to reflect and accommodate the different periods of time required for completing the execution of various sub-processes, operations, or instructions, although such periods of time may not even be perceivable by designers due to their short durations. In some other embodiments, the method or system may generate or provide the results or feedback in a batch mode where the method or system generates the results or feedback after a series of adjustments have been performed on the electronic design.

Figure 2A:
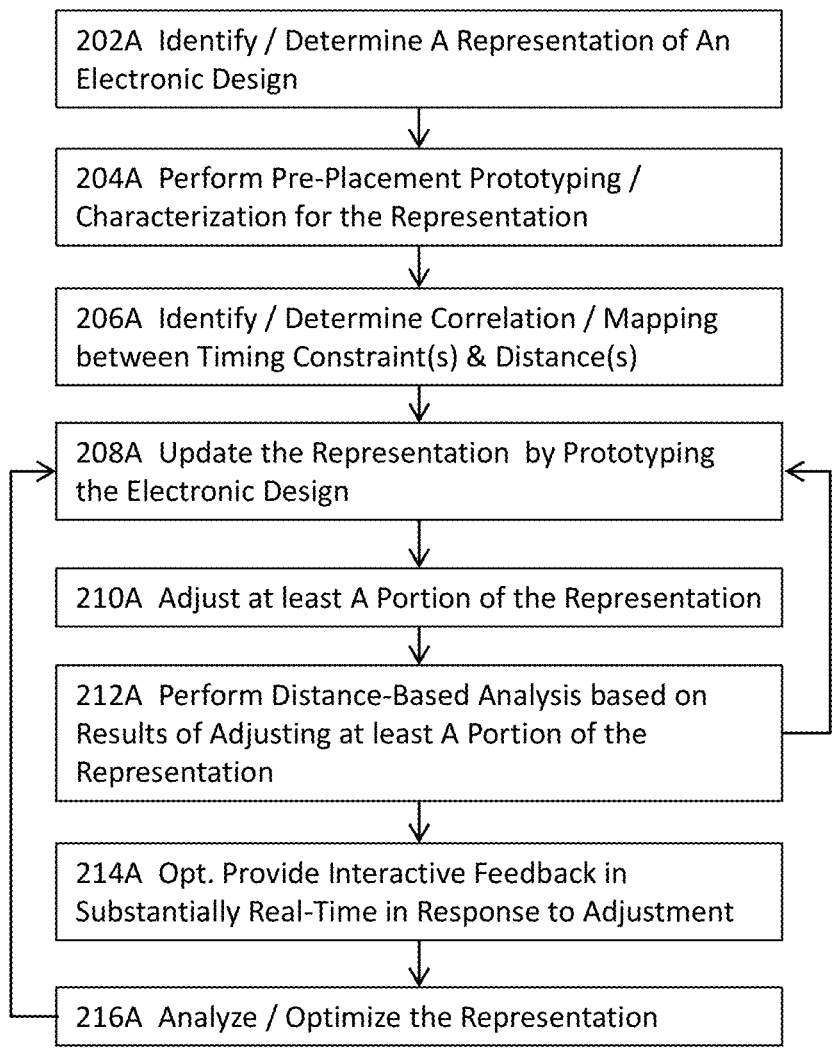
FIG. 2A illustrates a more detailed block diagram for a method or system for prototyping and floorplanning electronic circuit designs in some embodiments.

FIG. 2A illustrates a more detailed block diagram for a method or system for implementing prototyping and floorplanning for electronic circuit designs in some embodiments. More specifically, the method or system may first identify a representation of an electronic design at 202A. The representation of an electronic design may include an abstracted design at a higher abstraction level having the gate-level components of the electronic design or an abstracted version of the electronic design including flex-models such that the method or system handles a reduced set of design data to further enhance the efficiency and speed of various techniques described in this application. In some of the illustrated embodiments, the representation of the electronic design may include no or merely partial placement results, although the method or system may also function will full and equal effects with the complete placement results. At 204A, the method or system may perform prototyping or characterization for the representation of the electronic design.

In some of the illustrated embodiments, the characterization or prototyping may include characterizing object pairs in the representation where a path having the smallest available slack for a pair of circuit components is identified or selected for the pair. The object pair may thus be bound by the maximum distance value during when one or both objects in the object pair are modified (e.g., moved) during, for example, one or more what-if analyses or timing analyses. By identifying or selecting the path having the smallest available slack value and using the corresponding distance value to constrain the objects (e.g., flexmodels) in the object pair, the other paths (if any) between the objects in the object pair will automatically satisfy their respective distance constraints if the maximum distance constraint is met.

At 206A, the method or system may determine the correlation or mapping between timing constraints (e.g., available slack values for paths in the temporal dimension) and distance constraints (e.g., micrometers in the spatial dimension). For example, process or module 206A may convert or map timing constraints (e.g., available slack values for paths) into distance constraints and vice versa to determine and store the correlation or mapping into an electronic record including one or more files, one or more ordered or unordered lists, one or more tables, one or more databases, or any suitable data structures. In some embodiments where the correlation or mapping has been established, process or module 206A may identify such pre-existing correlation or mapping between the timing constraints and the distance constraints from one or more sources including, for example, one or more files, lists, tables, databases, formulae, or any combinations thereof.

For example, the maximum distance value corresponding to the smallest available slack value may be looked up from one or more files, lists, tables, or databases or may be determined by using one or more formulae based at least in part on, for example, heuristics, historical data of identical or similar designs, etc. In some embodiments, the method or system may identify a single path having the smallest available slack for each object pair in the representation and identify or determine the corresponding distance for the smallest available slack for the object pair. The method or system may then bind this object pair with the corresponding distance value. In some embodiments, the method or system may further construct (if non-existing) or update (if already existing) a distance-based timing data structure (e.g., a distance-based timing graph) including the object pair and the corresponding distance that constrains the object pair.

At 208A, the method or system may update the representation by prototyping the electronic design. In some embodiments, the method or system may prototype the electronic design by performing at least some placement or floorplanning to place one or more circuit component designs in the representation at 208A. Although placement is not required for various processes or modules to perform their respective functions, these various processes or modules still need to have the designs of at least two circuit components in the representation of the electronic design for timing analyses. These designs may be added to the representation manually by a designer or automatically via, for example, a placement or floorplanning tool. At 210A, at least a portion of the representation of the electronic design may be adjusted. The at least a portion of the representation may be adjusted on a component-by-component basis or in batches where multiple components are adjusted in each batch.

The at least a portion of the representation may be adjusted manually by a designer (e.g., a designer manually moves a component model or a flexmodel in the representation) or automatically by an electronic design automation tool. An adjustment of the at least a portion of the representation of the electronic design may be performed for one or more scripted or non-scripted what-if analyses for designers to determine the effects of the adjustment on performance the electronic design. The method or system may then perform the distance-based timing analysis at 212A. In some embodiments, the distance-based analysis may be performed based at least in part upon the results of adjusting at least a portion of the representation at 210A. For example, a first flexmodel may be moved to a different location at 210A, and the method or system may determine the new distance between the first flexmodel and a second flexmodel connected to the first flexmodel via a path for timing analysis purposes.

At 214A, the method or system may further optionally generate and provide interactive feedback in substantially real-time. For example, a designer may drag a component or a flexmodel with, for example, a point device over some distance in the representation. The distance and thus the timing information changes as the component or flexmodel is being dragged. The method or system may calculate the new distance and/or the other associated information (e.g., the corresponding timing information based on the new distance, timing check results, etc.) each time the point device triggers a signal of a position change. For example, a computer mouse may have a resolution of, for example, 400, 800, or 1600 dpi (dots per inch). Each time the optical sensor of the computer mouse detects a change in the position, the method or system may calculate the corresponding information or feedback and provide such information or feedback to the user as soon as the information or feedback is determined in some embodiments.

In some other embodiments, the method or system may calculate the corresponding information or feedback on one or more pre-determined temporal or spatial intervals (e.g., re-calculate new distance and/or timing related information once every 0.1 second or once every 50 dots traversed on screen, etc.). In some other embodiments, the method or system may detect the beginning and the end of the drag and calculate the new distance and/or timing related information based on the beginning and the end while ignoring the intermediate points. The method or system may then analyze or optimize the representation at 216A based at least in part upon the results of the distance-based timing analysis. In the aforementioned example for 214A, the method or system may determine the new distance after the drag and determine whether the drag successfully or unsuccessfully solves a timing issue or whether the drag creates one or more other issues or problems in the representation. In some embodiments, the method or system may return to 208A to re-perform prototyping for at least a portion of the electronic design for analyzing, optimizing, or fixing the representation. For example, the method or system may invoke the placement or floorplanning engine to alter the placement of the representation.

Figure 3:
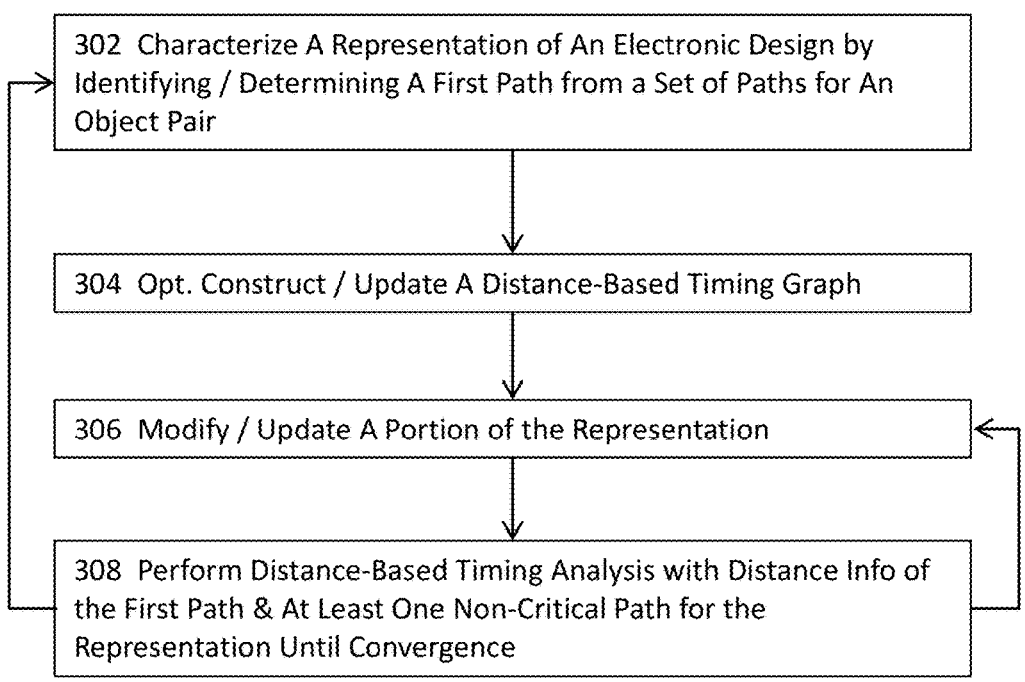
FIG. 3 illustrates a high level flow diagram for a method or system for prototyping and floorplanning electronic circuit designs in some embodiments.

FIG. 3 illustrates a high level flow diagram for a method or system for implementing prototyping and floorplanning for electronic circuit designs in some embodiments. In these embodiments illustrated in FIG. 3, the method or system may characterize a representation of an electronic design by identifying or determining a first path from a set of one or more paths for an object pair at 302. The representation of an electronic design may include an abstracted design (e.g., a floorplan) at a higher abstraction level having the gate-level components of the electronic design or an abstracted version of the electronic design including flexmodels such that the method or system handles a reduced set of design data to further enhance the efficiency and speed of various techniques described in this application. In some of these illustrated embodiments, the method or system may identify and characterize one or more object pairs, each of which includes a pair of circuit components with one or more paths connecting each other.

Characterization of a design may include identifying an object pair, including the designs of two circuit components, and the paths between the two circuit components in some embodiments. Characterization of a design may further include identifying the path having the smallest available slack from the one or more paths connecting the two components as well as determining the distance value corresponding to the smallest available slack value. The smallest available slack value corresponds to the maximum distance value for the object pair and may be derived from, for example, the clock period, the timing exceptions between the start point and the end point, and the skew derived from ideal latencies for the start and end point clocks in some embodiments. The slack value does not however depend on placement or routing and thus may need to be determined only once in the pre-placement representation to account for, for example, intrinsic gate delay but ignore routing or wire delays.

In some of the embodiments described in this application, the method or system may iteratively perform the distance-based timing analysis without the routing information and subsequently add the routing information to calibrate or fine tune the distance values and further perform one or more additional distance-based timing analyses. In some embodiments, the maximum allowable distance between two objects may be determined as the smallest available slack value converted into distance value minus the internal distance margin. The representation or abstracted version of the electronic design usually does not include sufficient details to indicate where or how deeply a register is located within a component or flexmodel. The internal distance margin compensates for the "depth" of a register within a component or a flexmodel and is therefore deducted from the total distance value converted from the minimum available slack value.

In some embodiments, the internal distance margin of a component or flexmodel may be determined as the square root of the total area of the component or flexmodel or the area of a bounding box of the component or flexmodel times a positive multiplier which may fall with a range of zero (0) to 0.8. In one embodiment, the internal distance margin is 0.2 or 20%. For a path connecting two components or flexmodels, the total internal distance margin includes the respective internal distance margin value calculated for each of the two components or flexmodels. Once the maximum allowable distance value is determined, the method or system may constrain the object pair with the distance constraint that includes the corresponding distance value as the maximum allowable distance between the components in the object pair. The method or system may further optionally construct or update a distance-based timing graph.

A distance-based timing graph may include the components as the nodes and the paths from the characterization (e.g., 302) as the edges connecting the nodes in the graph in some embodiments. In some of these embodiments where flexmodels are used to represent an electronic design, the distance-based timing graph includes a much smaller number of nodes than the actual number of instances. For example, practical applications of the model reduction techniques using flexmodels have demonstrated the use of a few hundred flexmodels to represent an electronic design having over 50 million instances. Due to the relatively smaller number of nodes in the distance-based timing graph, the graph also includes a relatively smaller number of edges as well. Moreover, each edge in a distance-based timing graph represents the worst or smallest available slack between a pair of nodes because it is the path having the smallest available slack that is identified for the pair of nodes.

Each edge may be identified with its own identification. For example, an edge connecting the first component and the second component may be associated with the identification "d12" where "d" indicates "distance-based", "1" indicates the first node or the source node, and "2" indicates the second node or the destination node. A distance-based timing graph may also include a through edge that connects two nodes through a third node. For example, a through edge may connect the first node and the second node through the third node and thus may be identified as, for example, d132 where "d" indicates "distance-based", "1" indicates the source node, "2" represents the destination node, and "3" denotes the third node. The segment of a through edge within a node may be termed as an "internal through edge". In some embodiments including flexmodels in the representation, each flexmodel may be limited to have at most one internal through edge.

At 306, at least a portion of the representation may be modified or updated. For example, the at least a portion of the representation may be adjusted manually by a designer (e.g., a designer may manually move a component model or a flexmodel in the representation) or automatically by an electronic design automation tool. An adjustment of the at least a portion of the representation of the electronic design may be performed for one or more scripted or non-scripted what-if analyses for designers to determine the effects of the adjustment on performance the electronic design. For example, the method or system may modify a portion of the representation for one or more what-if analyses, sensitivity analyses, or uncertainty analyses for timing and/or congestion checks. One or more distance-based timing analyses may be performed at 308 to analyze the timing and/or congestion behavior of the representation of the electronic design.

In some embodiments, the congestion behavior may be analyzed based at least in part upon the total number of connections or paths of a sub-region of the representation. When a portion of the representation is modified or updated, an originally identified critical path may no longer be critical, whereas another non-critical path may become critical due to the modification or update of the portion. The method or system may return to 302 to identify or confirm the identification of the path for an object pair and repeat the other operations as described above until a stop criterion is reached (e.g., convergence in the analysis or a prescribed number of iterations, etc.) without having to monitor and calculate timing information for all the paths in the representation in order to capture such newly created critical paths due to some modifications of an electronic design.

Another advantage of this approach described in FIG. 3 is that although these embodiments identify a single path for each object pair and determine the distance information (and hence timing information) for the identified single path, any newly formed critical paths having timing issues (e.g., having a negative slack value or having a slack value larger than the allowable slack value) may still be captured and analyzed. This is in sharp contrast with the conventional timing analysis approaches that only monitors the critical paths and thus cannot provide timing information for all the paths and the conventional approaches that monitor and calculate timing information for all the paths and thus require a long runtime (tens of minutes to hours per iteration and days or even weeks for the timing analysis and placement to converge) to obtain useful results. In some embodiments, the method or system may return from 308 to 306 to continue with the modification or update of the representation and the distance-based timing analysis.

Figure 3A:
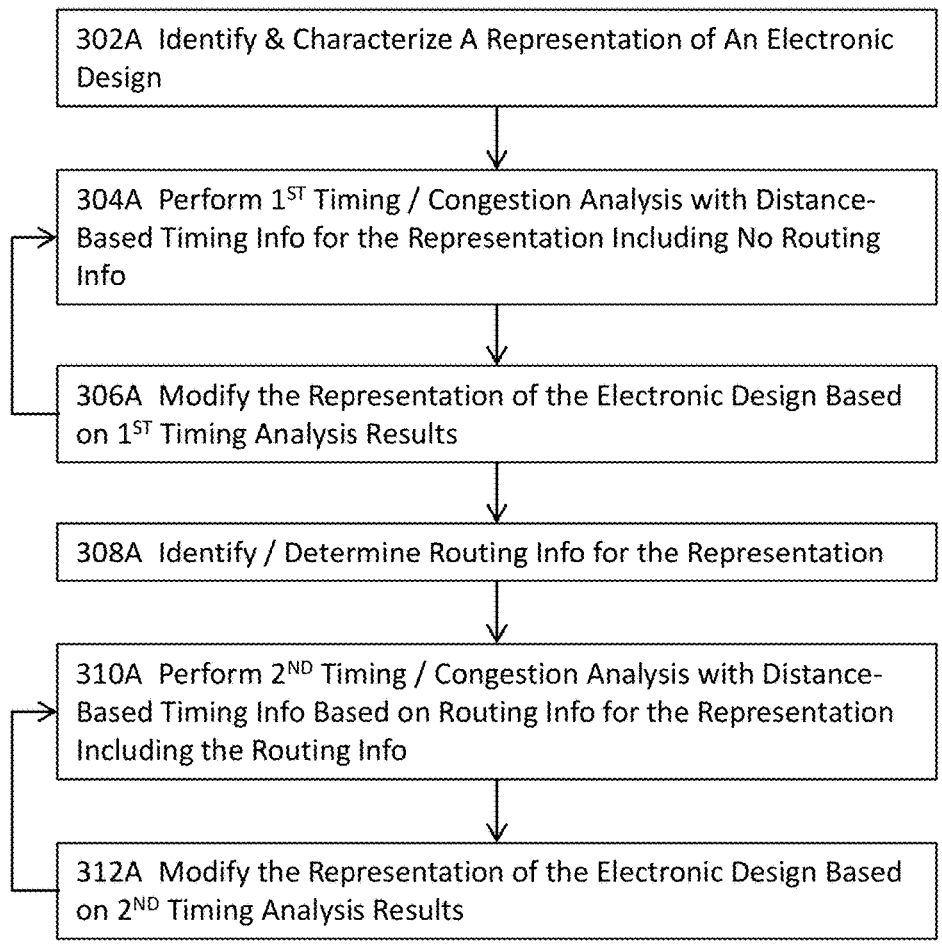
FIG. 3A illustrates a high level flow diagram for a method or system for prototyping and floorplanning electronic circuit designs in some embodiments.

FIG. 3A illustrates a high level flow diagram for a method or system for implementing prototyping and floorplanning for electronic circuit designs in some embodiments. In these embodiments illustrated in FIG. 3A, the method or system may identify and characterize a representation of an electronic design at 302A and performing the first timing and/or congestion analysis with distance-based timing information at 304A as described previously for the representation that includes no routing information. As described previously, the maximum allowable distance for an object pair may be derived from the smallest available slack value that may be derived from, for example, the clock period, the timing exceptions between the start point and the end point, and the skew derived from ideal latencies for the start and end point clocks in some embodiments.

The slack value does not, however, depend on placement or routing and thus may need to be determined only once in the pre-placement representation to account for, for example, intrinsic gate delay but ignore routing or wire delays. At 306A, the method or system may modify or update at least a portion of the representation of the electronic design based at least in part upon the first timing analysis results. The method or system may iterate between 304A and 306A until convergence or a prescribed stopping criterion is reached for the representation. It shall be noted that at this point no routing information in included in the representation or the analyses. The method or system may further proceed to 308A to identify or determine routing information for the representation.

The routing information may include one or more global routes, one or more trial routes, one or more detail routes, or any combinations thereof. The routing information may be used to calculate or refine some of the distance information determined at 302A where the routing information was unavailable. In some embodiments where the routing information includes information of one or more trial routes, the trial routes may be determined with preference to critical nets. In these embodiments, the actual routes for these critical routes may thus be routed with minimal or a relatively fewer number of detours due to the preference to the critical nets. The method or system may perform the second distance-based timing and/or congestion analysis with the distance information updated with the routing information at 310A. At 312A, the method or system may modify or update at least a portion of the representation of the electronic design. The method or system may similarly iterate between 310A and 312A until convergence or a prescribed stop criterion is reached for the representation.

Figure 3B:
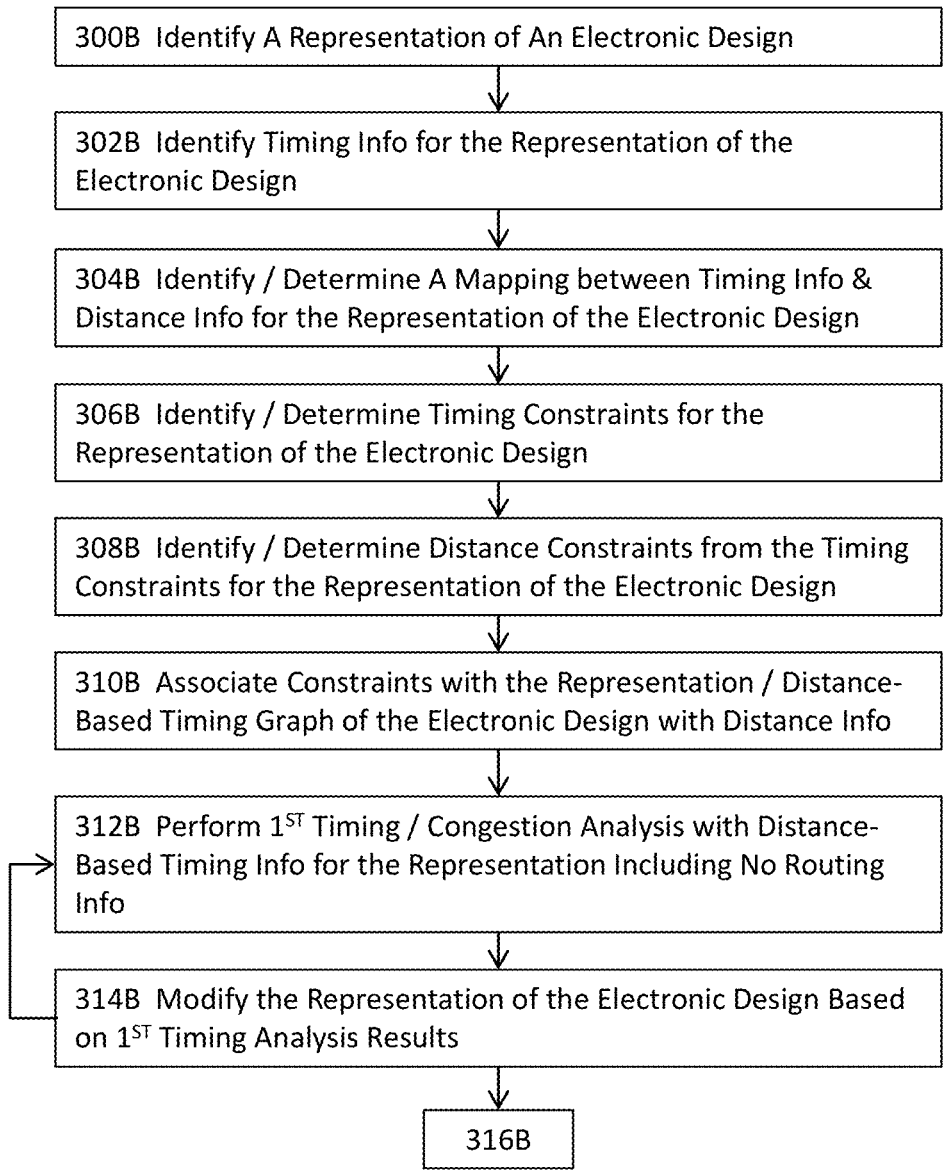
FIGS. 3B-C jointly illustrate a more detailed flow diagram for a method or system for prototyping and floorplanning electronic circuit designs in some embodiments.
Figure 3C:
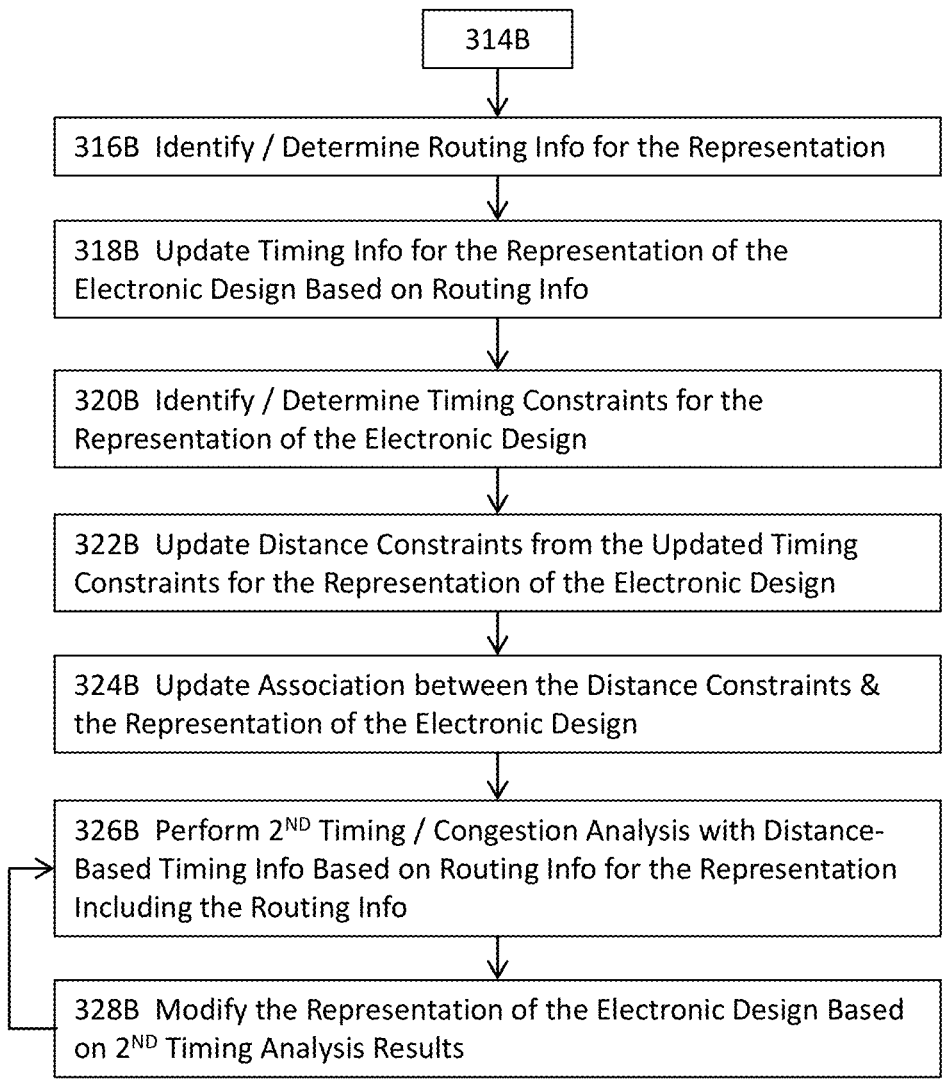

FIGS. 3B-C jointly illustrate a more detailed flow diagram for a method or system for implementing prototyping and floorplanning for electronic circuit designs in some embodiments. In these embodiments illustrated in FIGS. 3B-C, the method or system may identify a representation of an electronic design at 300B. The representation may include a floorplan having the design of one or more circuit components that are added to the floorplan with or without performing the placement process in some embodiments. The representation may include an abstracted version of an electronic design that is obtained by some model reduction techniques and does not contain all the detailed information of all granularity levels in some other embodiments. In these embodiments, the representation may include the gate-level component designs of the electronic design or an abstracted version of the electronic design including flexmodels.

At 302B, the method or system may identify timing related information for the representation. The timing related information may include required arrival times, data required times, setup times, hold times, clock period, timing exceptions, ideal latencies, skews, or any combinations thereof, etc. In some embodiments, the method or system identify the minimum available slacks for paths in the representation at 302B. A mapping or correlation between slack values and their respective distance values may be determined or identified at 304B. The mapping or correlation may be determined or identified from historical data of identical or similar electronic designs, heuristics, one or more physics based models, or any combinations thereof. The mapping or correlation may include many different forms including, for example, one or more files, lists, tables, databases, formulae, or any combinations thereof.

Timing constraints may be identified or determined for the representation of the electronic design at 306B. The timing constraints may include available slacks for paths, gate delays, wire delays, timing budgets, or any combinations thereof in some embodiments. At 308B, the method or system may identify or determine distance constraints from the timing constraints. For example, the method or system may identify or determine the maximum allowable distance in the spatial dimension from the minimum available slacks in the temporal dimension by using the correlation or mapping identified or determined at 304B. The identified or determined distance constraints may then be associated with the representation or a distance-based timing graph at 310B as previously described. A first timing and/or congestion analysis with the distance-based timing information or constraints may be performed for the representation including at 312B.

In some of the illustrated embodiments, the representation or the electronic design may not contain any routing information. In these embodiments, the representation and the electronic design are constructed in the pre-placement stage. In these embodiments, the method or system accounts for the intrinsic gate delays while ignoring the routing or wire delays at this stage. The representation of the electronic design may be modified or updated at 314B for various purposes including, for example, what-if analysis, floorplan optimization, sensitivity analyses, or uncertainty analyses, or any combinations thereof. The method or system may iterate between 312B and 314B and may even invoke the placement or floorplanning engine to manipulate or process the modified or updated representation until convergence or a stopping criterion is reached.

In some embodiments where at least a part of the representation or the design has been routed, routing information may be identified for the representation at 316B, and the method or system may further update the distance-based timing information with the routing information at 318B. The method or system may further identify one or more additional timing constraints such as constraints on routing delays or update one or more existing timing constraints with the routing information for the representation at 320B.

At 322B, the method or system may use the routing information to update or fine tune at least some of the distance-based information that was determined (e.g., at 308B) without using or referencing the routing information. For example, the method or system may use a trial route or a detail route to update the distance-based information that was determined prior to the routing information.

At 324B, the method or system may update the association determined at 310B with the updated distance-based timing constraints. A second timing and/or congestion analysis may be performed with the updated distance-based timing information or constraints at 326B for the representation now including the routing information. The representation of the electronic design may be modified or updated at 328B for various purposes including, for example, what-if analysis, floorplan optimization, sensitivity analyses, or uncertainty analyses, or any combinations thereof. The method or system may iterate between 326B and 328B and may even invoke the placement or floorplanning engine to manipulate or process the modified or updated representation until convergence or a stopping criterion is reached as the method or system does between 312B and 314B without referencing or using routing information.

Figure 4:
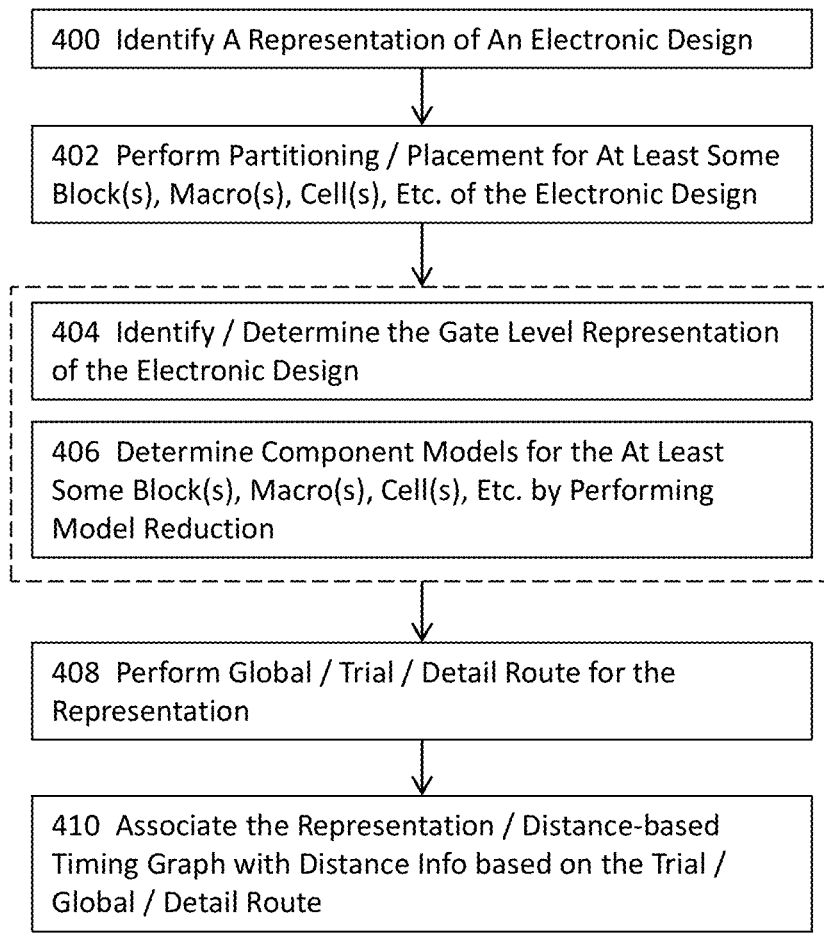
FIG. 4 illustrates a more detailed flow diagram for a process or module for method or system for prototyping and floorplanning electronic circuit designs as illustrated in FIG. 3A in some embodiments.

FIG. 4 illustrates a more detailed flow diagram for a process or module for method or system for implementing prototyping and floorplanning for electronic circuit designs as illustrated in FIG. 3A in some embodiments. More specifically, FIG. 4 illustrates more details about the identification of a representation of an electronic design 400. In these embodiments illustrated in FIG. 4, the process or module may optionally perform partitioning and/or placement for at least some components, blocks, macros, or cells, etc. for an electronic design. As described previously, although placement is not required for various processes or modules to perform their respective functions, these various processes or modules still need to have the designs of at least two circuit components in the electronic design for timing and/or congestion analyses. Therefore, the method or system may invoke the placement or floorplanning engine to place the designs of some circuit components in the electronic design at 402.

At 404, the process or module may identify or determine the gate level representation of the electronic design as the representation identified at, for example, 302A or 308B described above. Alternatively, the process or module may identify or determine one or more component models for these at least some components, bocks, macros, or cells, etc. by using some model reduction techniques at 406. In some of these latter embodiments, the process or module may identify or determine one or more flexmodels for the representation of the electronic design. The process or module may perform global, trial, and/or detail routing for at least a portion of the representation at 408. As described above, various techniques described in this application does not necessarily require routing information in order to perform their respective functions to achieve the desired purposes.

Routing information may nevertheless be used to determine more accurate distance information for the paths than the distance information that is obtained without using the routing information. The representation or the distance-based timing graph may then be associated with the updated distance information at 410 based at least in part upon the routing information. For example, the distances determined from, for example, Manhattan distances between two nodes in the distance-based timing graph may be updated with the routing information; and distance information based on global route information may be updated with the detail routing information or the C-routing information. C-routing information includes actual geometry information of wires or interconnects between pins, terminals, pads, or ports of blocks or cells but not routes inside each block or cell. In other words, a C-route (conduit route) includes an actual wire between two portions of an electronic design, and a C-router (conduit router) used to implement the C-routes is thus different from a channel router.

Figure 5:
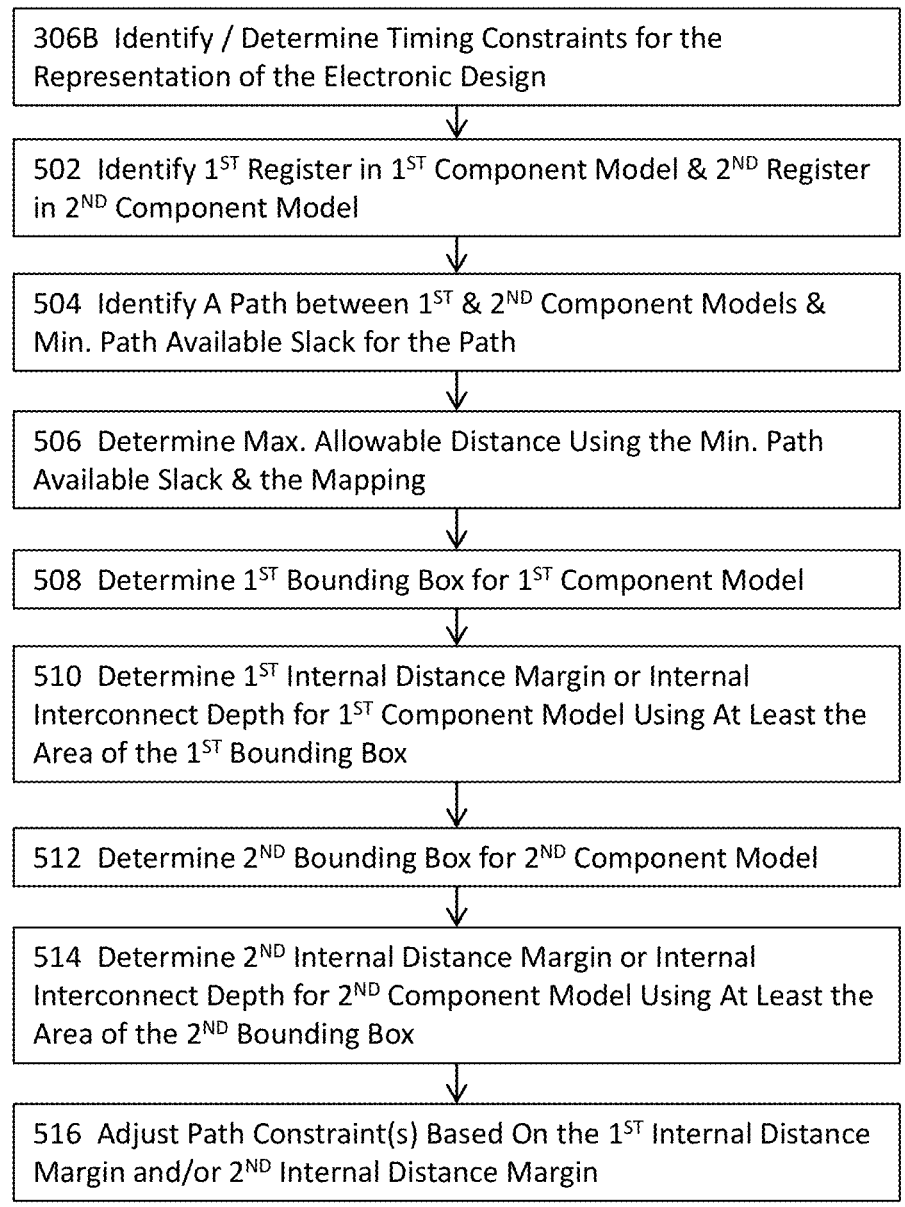
FIG. 5 illustrates a more detailed flow diagram for a process or module for method or system for prototyping and floorplanning electronic circuit designs as illustrated in FIG. 3B in some embodiments.

FIG. 5 illustrates a more detailed flow diagram for a process or module for method or system for implementing prototyping and floorplanning for electronic circuit designs as illustrated in FIG. 3B in some embodiments. More specifically, FIG. 5 illustrates more details about the identification or determination of timing constraints (e.g., 306B of FIG. 3B) for a representation of an electronic design. In these embodiments illustrated in FIG. 5, the process or module may identify a first register in a first component model and a second register in a second component model at 502. A component model may include the design having all the details of a circuit component, a block, a cell, a macro, or a portion of a complete electronic design in some embodiments. In some other embodiments, a component model may include the design that does not have all the details of a circuit component, a block, a cell, a macro, or a portion of a complete electronic design so that the circuitry may be fabricated or manufactured with the component alone.

In these embodiments, a component model may include an abstracted model of a circuit component, a block, a cell, a macro, or a portion of a complete electronic design at a higher abstraction level and may be obtained by using various model reduction techniques. For example, a component may include a flexmodel in some of these embodiments. At 504, the process or module may identify a path between the first component model and the second component model and the available slack value for the path. In some of these embodiments where there are more than one path between the first and the second component models, the process or module may identify the path that is associated with the minimum or smallest available slack at 504. If there are multiple paths between the two components, the non-selected paths between these two circuit components will automatically satisfy the timing requirements (e.g., non-negative slack values for all paths) when the path having the smallest available slack is selected and converted into the corresponding distance value to limit how far apart the two circuit components may be moved.

The maximum allowable distance between the first and the second component models may be determined by referring to the correlation or mapping between slack values and distance values at 506 as described above with reference to, for example, FIG. 2A. In some embodiments, the process or module may optionally determine a first bounding box for the first component model at 508. The first bounding box encloses and thus occupies an area that is not smaller than the area occupied by the first component model in these embodiments. The first component model (due to, for example, abstraction) or the electronic design itself may or may not contain the information for registers within the first component model at this early floorplanning or placement stage.

In some embodiments where the register in the first component model is not available, the process or model may further determine the first internal distance margin or the first internal interconnect depth for the first component model at 510. The first internal distance margin or internal interconnect depth is used to approximate the location of the register within the first component in the event that the actual location of the register in the first component model is unavailable. The first internal distance margin or internal interconnect depth may be determined in a variety ways. For example, the internal distance margin or internal interconnect depth for a component model may be determined with the following formula in some embodiments:

(Internal Distance Margin/Internal Interconnect Depth)=$C_i \times \sqrt{(\text{AreaofBoundingBoxofComponentModel})}$, or (1)

(Internal Distance Margin/Internal Interconnect Depth)=$C_i \times \sqrt{(\text{AreaofComponentModel})}$, or (2)

In the above illustrative formulae, the multiplier Ci may include a non-negative real number between 0 and 1. In some embodiments, the multiplier Ci is 0.2 or 20%. It shall be noted that although the aforementioned formulae use the square root of some forms of the area related to the component model, other formulae using other forms of two-dimensional or linear dimensions may also be used. In a substantially similar or identical manner, the process or model may also optionally determine the second bounding box for the second component model at 512 and the second internal distance margin or the second internal interconnect depth for a second register within the second component model at 514. At 516, the process or module may adjust one or more path constraints for the paths between the first and the second component models by using the maximum allowable distance determined or identified at 506. In some embodiments where the internal distance margins are determined at 510 and 514, the one or more path constraints may further be adjusted with the internal distance margins. For example, the distance-based timing constraint for the path identified at 504 may be adjusted as:

(New Distance-Based Timing Constraint)=(Maximum Allowable Distance)−[(First Internal Distance Margin)+(Second Internal Distance Margin)] (3)

The distance-based timing constraint may then be used to constrain the component models in the representation of the electronic design for timing and/or congestion analysis purposes. In the aforementioned embodiments, the method or system may generate and present an error or warning to the user when a negative slack value is encountered. In some other embodiments, the method or system may enforce the requirement of non-negative slack values by using one of the following distance-based timing constraints:

New Distance-Based Timing Constraint=MAX{0, distance value corresponding to the smallest allowable slack value−$\Sigma_i$(Internal Distance Margin)$i$} (3A)

New Distance-Based Timing Constraint=MAX{0, (Maximum Allowable Distance)−[(First Internal Distance Margin)+(Second Internal Distance Margin)]} (3B)

Figure 6A:
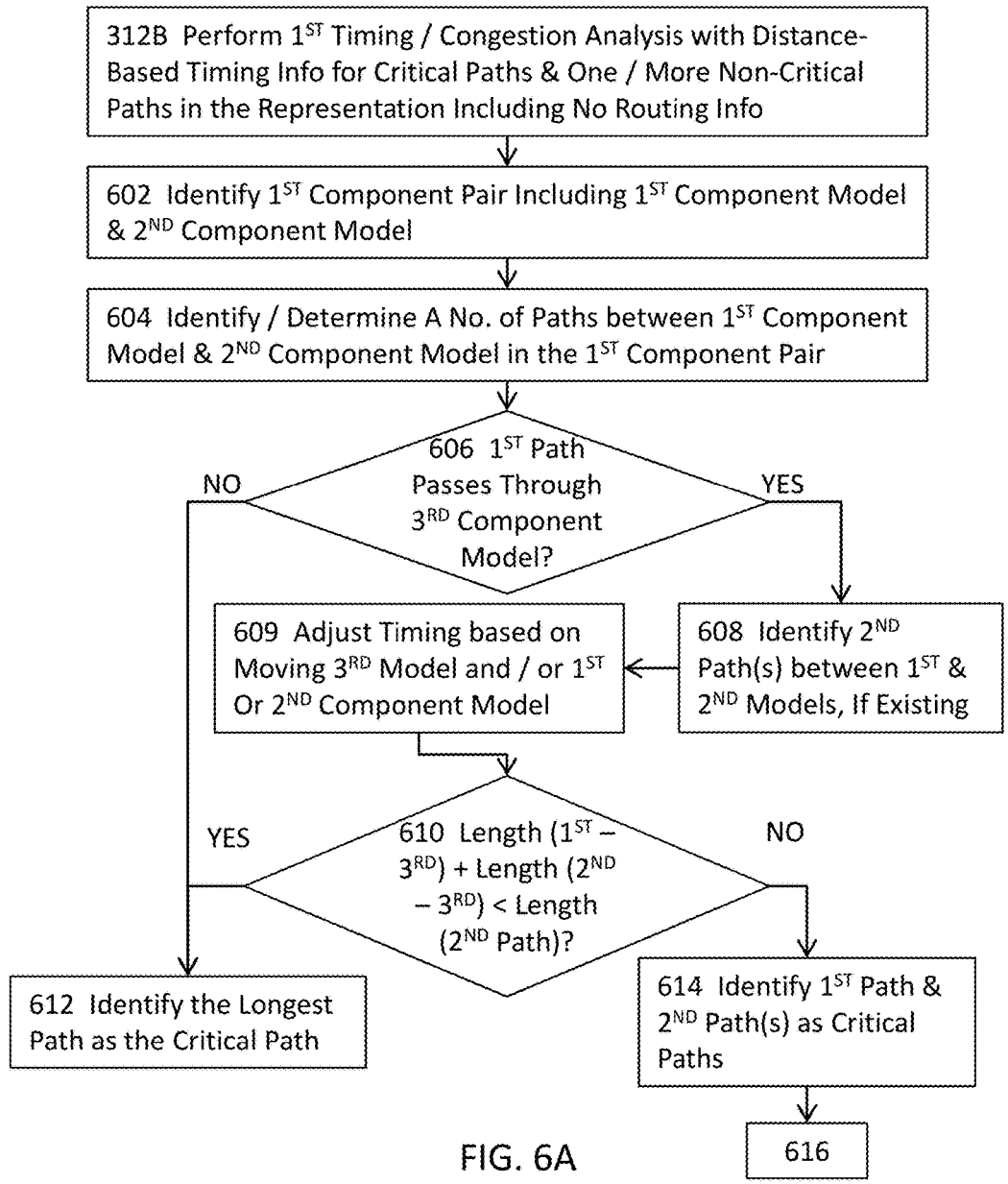
FIGS. 6A-B jointly illustrate a more detailed level flow diagram for method or system for prototyping and floorplanning electronic circuit designs as illustrated in FIG. 3B in some embodiments.
Figure 6B:
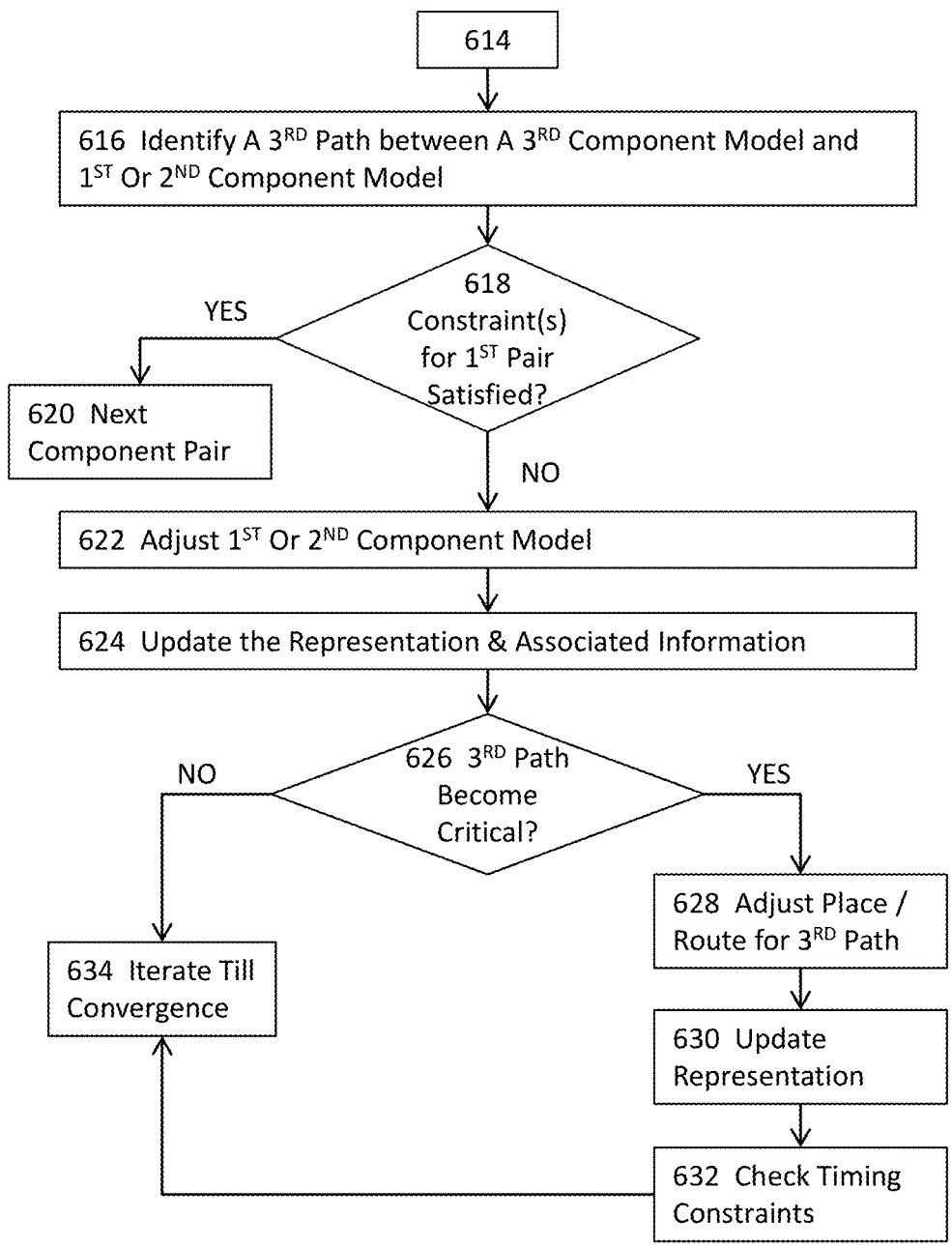

FIGS. 6A-B jointly illustrate a more detailed level flow diagram for method or system for implementing prototyping and floorplanning for electronic circuit designs as illustrated in FIG. 3B in some embodiments. More specifically, FIG. 6A illustrates more details about the process or module of performing timing and/or congestion analysis (e.g., 312B of FIG. 3B) in some embodiments. In these illustrated embodiments, the process or module may identify a first component pair including a first component model and a second component model at 602. The total number of paths between the first and the second component models may be identified or determined at 604. In some of these embodiments, the process or module may identify a first path from the total number of paths. In some of these embodiments, the path that is associated with the smallest available slack in the total number of paths may be identified as the first path at 604.

If only one path exists between the first and the second component models, the only path will be identified as the first path at 604. The process or module may further determine whether or not the first path passes through a third component model at 606. The third component model (e.g., the first or the second component model described above for FIGS. 5 and 6A) may include, for example, a combinational logic block model or a block of sequential gates in some embodiments. If it is determined that the first path does not pass through the third component model at 606, the process or module may proceed to 612 to identify the first path or the longest path having the longest distance between the first and the second component models as the path of interest or the critical path.

Otherwise, the process or module may proceed to 608 to identify a second path between the first and the second component models, if more than one path between these two component models exists, and to adjust the timing information (e.g., distance-based timing information) based at least in part upon moving the third component model at 609. The process or module may then identify or determine the first distance between the first component model and the third component model, the second distance between the second component model and the third component model, and the distance of the second path at 610. If it is determined that the sum of the first distance and the second distance is less than the distance information of the second path, the process or module may proceed to 612 to identify the longest path as the path of interest or the critical path. Otherwise, the process or module may identify the path including the first sub-path between the first and the third component models as well as the second sub-path between the second and the third component models as the path of interest or as the critical path at 614.

The distance information may also be adjusted by the internal distance margins as described above with reference to FIG. 5. In these embodiments illustrated in FIGS. 6A-B, the method or system re-calculates the timing information between the first and the second component models when the third component model moves in the representation of the electronic design. Moreover, when the sum of the distances between the first and the third component models as well as between the second and the third component models is less than the length of another path between the first and the second component models, the method or system may maintain both paths (the path passing the third component model and the path not passing through the third component model) in the analysis. On the other hand, the method or system may maintain only the path passing through the third component model if the sum of the lengths of two sub-paths is less than the length of the path not passing through the third component model.

At 616, the process or module may identify a third path between the third component model and the first or the second component model. In these embodiments, the path passing through the third component model is determined not to be a critical path. The process or module may then determine whether or not one or more timing constraints (e.g., distance-based timing constraints) are satisfied at 618. If the one or more timing constraints are determined to be satisfied, the process or module may proceed to 620 to identify the next component pair. Otherwise, the process or module may proceed to 622 to adjust the first component model and the second component model by, for example, moving the first component model, the second component model, or both to change the distance between the two component models. After the adjustment to one or both component models in the component pair at 622, the process or module may update the representation and/or the associated information at 624.

For example, the process or module may recalculate the timing information based at least in part upon the adjustment at 622 and update the distance-based timing graph with the updated timing information (e.g., the distance-based timing information based on the adjustment to the component pair). The process or module may further determine whether another path between the first and the second component models is made critical due to the adjustment to one or both component models in the component pair at 626. A path that meets the associated timing constraints may be made critical if the path is changed in a way that causes the path to fail to meet one or more constraints. In some of these illustrative embodiments, the path may be situated between a third component model and one of the component models in the component pair.

If it is determined that the adjustment to the component pair does not render other paths critical, the process or module may proceed to 634 to iteratively perform the timing and/or congestion analysis and/or, for example, the what-if analysis until convergence. On the other hand, if it is determined that a third path, which originally satisfied its respective one or more timing constraints (e.g., one or more distance-based timing constraints), is rendered critical due to the adjustment of the component pair at 622, the process or module may adjust the floorplanning, placement, or routing involving the third path at 628. The timing information may be updated at 630 to reflect the adjustment at 628, and the process or module may check one or more timing constraints (e.g., distance-based timing constraints or the timing constraints) in the representation to determine whether these one or more timing constraints are satisfied at 632. The process or module may proceed to 634 to iteratively perform various adjustments to the component pair or to the other portion of the representation, various timing and/or congestion analyses, various what-if analyses involving the component pair, and/or other analyses until convergence.

Figure 6C:
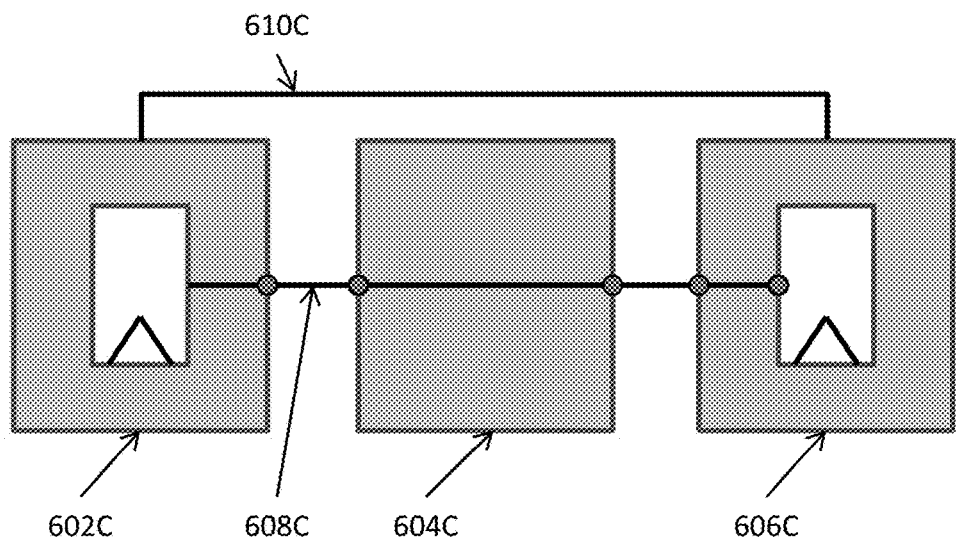
FIGS. 6C-6D illustrate the applications of the methods for prototyping and floorplanning electronic circuit designs described herein in some embodiments.
Figure 6D:
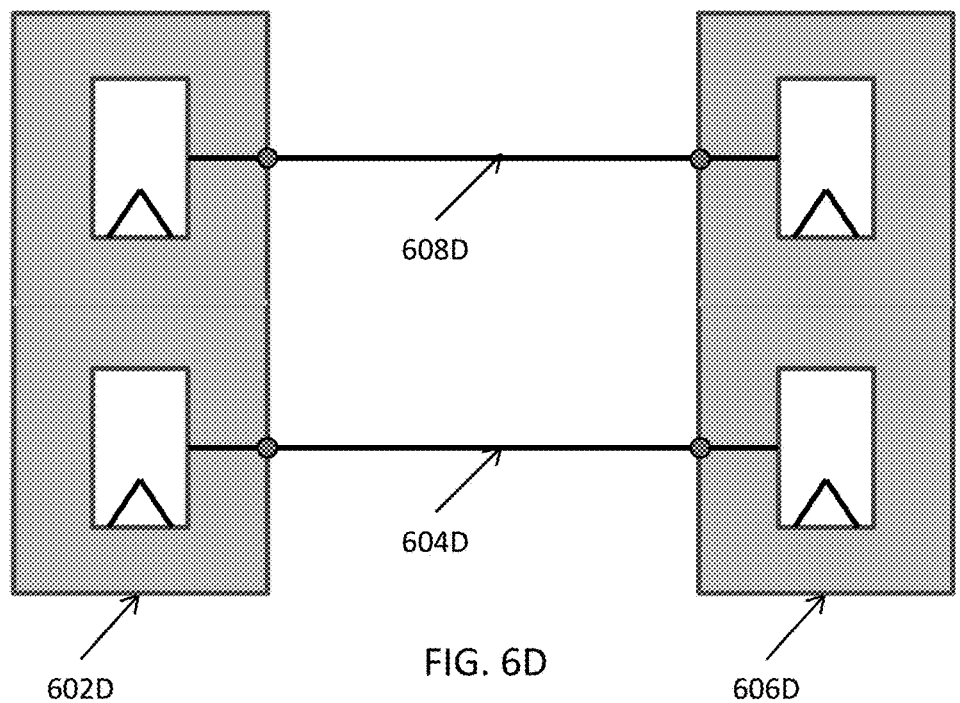

FIGS. 6C-6D illustrate the applications of the methods for implementing prototyping and floorplanning for electronic circuit designs described herein in some embodiments. More specifically, FIG. 6C illustrates a scenario where the worst path 608C (the first path) between the first component model 602C and the second component model 606C passes through another component model 604C that includes a block of sequential gates or a combinational logic. In these illustrated embodiments, the method or system captures the dependencies between the first and the second component models and further recalculates the timing between the first component model 602C and the second component model 606C during or after the third component model 604C is or is being moved. In addition, if there exists a second path 610C between the first and the second component models 602C and 606C, the method or system may monitor and keep both the first path 608C and the second path 610C if the first path 608C passing through the third component model 604C is determined not to be a critical path.

On the other hand, if the first path 608C is determined to be a critical path, the method or system may monitor and keep the first path 608C alone. In some embodiments, the method or system may determine whether to keep the first path 608C alone or both the first path 608C and the second path 610C by determining whether the sum of the distance between the first component model 602C and the third component model 604C and the distance between the third component model 604C and the second component model 606C is less than the length of the path 610C, the method or system may keep the first path 608C passing through the third component model 604C. Otherwise, the method or system may keep both the first path 608C and the second path 610C.

FIG. 6D illustrates the scenario where the first component model 602D and the second component model 606D are connected by the first path 604D and the second path 608D, and there exists no other component models along either the first path 604D or the second path 608D. In this scenario, the method or system may identify the path associated with the smallest available slack as the path to keep or the path between the first component model 602D and the second component model 606D in the distance-based timing graph. It shall be noted that this identification of a path as the critical path is based on the assumption that the net segments within the two component models (e.g., between the ports inside each component model) are much shorter than the net segment between the two component models. In some other embodiments where this assumption may be challenged, the method or system may further compensate for the distances or lengths of the net segments within each component model by using an estimate length based on, for example, historical data or heuristics. In addition, the distance-based constraint may be determined by the distance value corresponding to the smallest available slack of the identified path minus the internal distance margin for each component model as described above.

Figure 7:
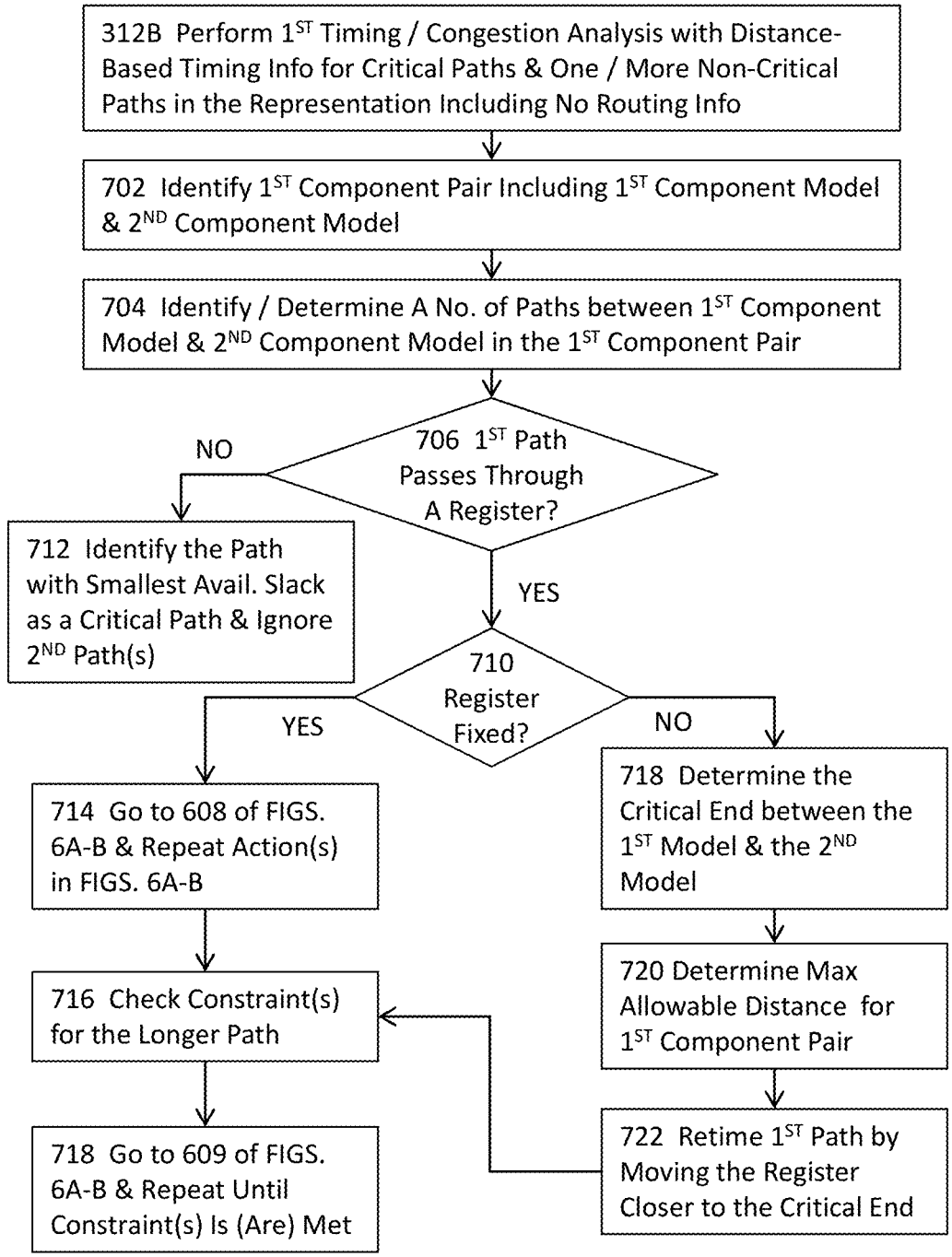
FIG. 7 illustrates a more detailed flow diagram for a process or module for method or system for prototyping and floorplanning electronic circuit designs as illustrated in FIG. 3B in some embodiments.

FIG. 7 illustrates a more detailed flow diagram for a process or module for method or system for implementing prototyping and floorplanning for electronic circuit designs as illustrated in FIG. 3B in some embodiments. More specifically, the process or module may identify a first component pair that includes a first component model and a second component model at 702 and identify a number of paths between the first component model and the second component model in the first component pair at 704. The method or system may then identify a first path from the number of paths. In some embodiments, the process or module may identify the path associated with the smallest available slack as the first path. The process or module may then determine whether the first path passes through a register that is located at the same abstraction level as the first and the second component models at 706.

If it is determined that the first path does not pass through a register, the process or module may identify the path associated with the smallest available slack or the largest distance or length value from the number of paths as the critical path at 712 for the first component pair. Otherwise, the process or module may proceed to determine whether the register is fixed or floating at 710. If the register is determined to be fixed, the process or module may treat the register as a component model and the path through the register as one passing through a component model at 714 to direct the process module to 608 of FIG. 6 to employ the techniques described therein in a substantially similar manner as those described above with reference to FIGS. 6A-D. The process or module may further proceed to 716 to check one or more timing constraints (e.g., distance-based timing constraints or the timing constraints in the temporal space) to determine whether these one or more timing constraints are satisfied. In some embodiments where at least one of the one or more constraints are not met, the method or system may proceed to 718 and return to 609 of FIGS. 6A-B to continue to adjust or modify the first component model and/or the second component model to repeat at least some of the actions following 609 in FIGS. 6A-B until the one or more constraints are satisfied. It shall be noted that in these embodiments, the "third component model" is the register that is determined to be fixed for placement, and thus the method or system may adjust the first component model and/or the second component at 609 in these embodiments illustrated in FIG. 7.

If the register is determined not to be fixed at 710, the process or module may identify or determine the relative more critical end from the first component model and the second component model at 718. That is, the process or module may determine whether the first net segment between the register and the first component model is more critical than the second net segment between the same register and the second component model. The maximum allowable distance for the first component pair may also be determined at 720 based at least in part upon the smallest available slack of the net segments or the paths, and the process or module may retime the first path by moving the register closer to the relatively more critical end via, for example, a placement or floorplanning process or module. The maximum allowable distance may also be adjusted by the internal distance margin of one of the component model in the first component pair as described above. That is, the component pair may be constrained by the maximum distance from the available slack associated with the path passing through the register, and the register may be moved closer to the relatively more critical end in some of these embodiments where the register is determined not to be fixed in the representation. The first path may be retimed at 722 by moving the register closer to the critical end in some embodiments, and the method or system may return to 716 to check one or more timing constraints (e.g., distance-based timing constraints or the timing constraints in the temporal space) to determine whether these one or more timing constraints are satisfied.

Figure 7A:
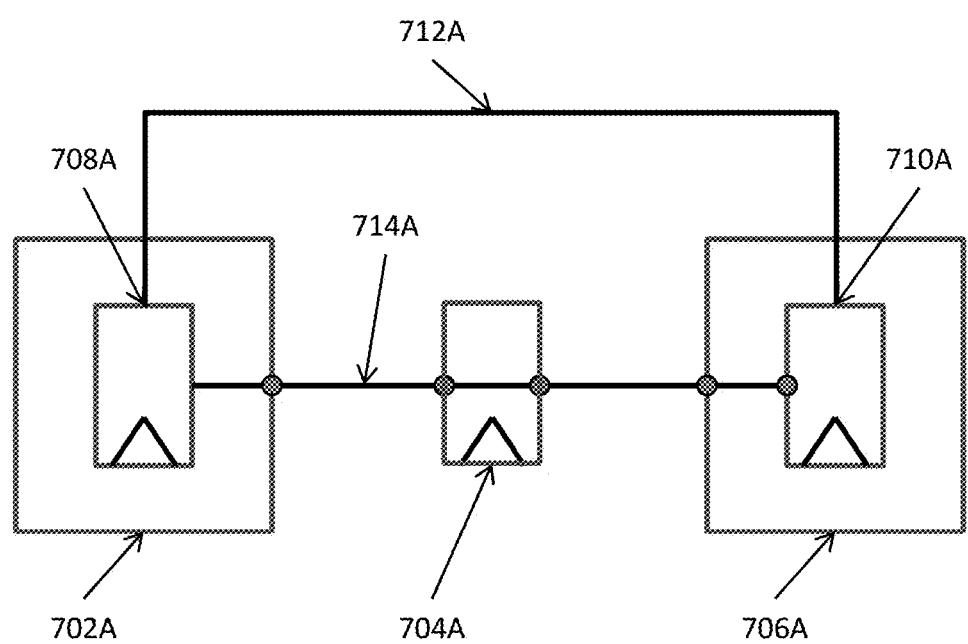
FIG. 7A illustrates the application of the methods for prototyping and floorplanning electronic circuit designs described herein in some embodiments.

FIG. 7A illustrates the application of the methods for implementing prototyping and floorplanning for electronic circuit designs described herein in some embodiments. More specifically, FIG. 7A illustrates the embodiments where the first component model 702A and the second component model 706A are connected by a first path 714A passing through a register 704A and a second path 712A between the first component model 708A and the second component model 710A. In some of these embodiments where the register 704A is fixed in the representation, the method or system may simply treat the fixed register 704A as another component model and use a substantially similar or identical approach described above with reference to FIGS. 6A-D. In these embodiments, the method or system need not keep or maintain the second path 712A in the timing and/or congestion analyses. If the register 704A is not fixed in the representation, the method or system may identify the path associated with the smallest slack value as the critical path and retime the first path 714A by moving the register to the relatively more critical end of the two component models. The distance-based timing constraint or the maximum allowable distance between the two component models may be determined from the smallest available slack and may further be optionally adjusted by the internal distance margins of the first and second component models as described above.

System Architecture Overview

Figure 8:
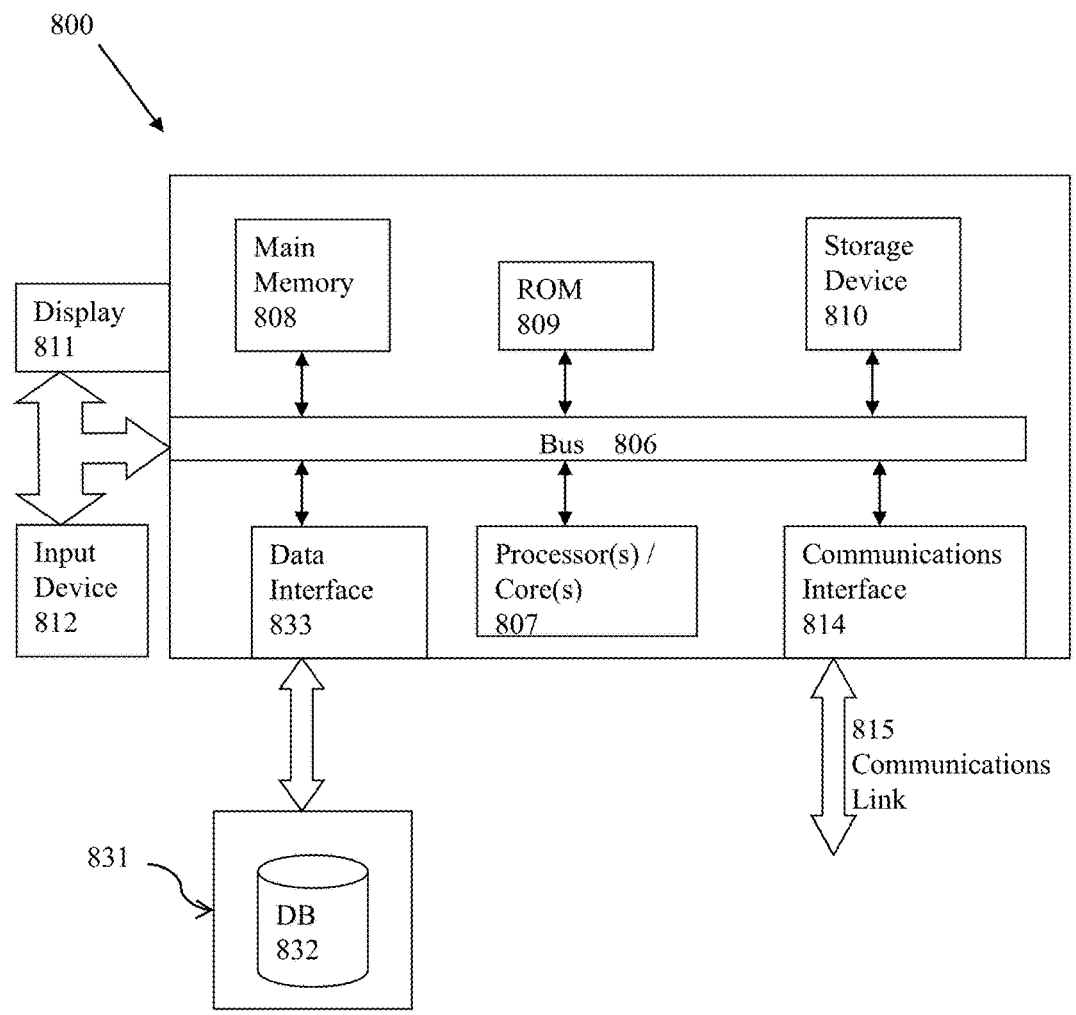
FIG. 8 illustrates a computerized system on which a method for prototyping and floorplanning electronic circuit designs can be implemented.

FIG. 8 illustrates a block diagram of an illustrative computing system 800 suitable for implementing prototyping and floorplanning for electronic circuit designs as described in the preceding paragraphs with reference to various figures. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment, computer system 800 performs specific operations by one or more processor or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 807, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. In an embodiment, the computer system 800 operates in conjunction with a data storage system 831, e.g., a data storage system 831 that includes a database 832 that is readily accessible by the computer system 800. The computer system 800 communicates with the data storage system 831 through a data interface 833. A data interface 833, which is coupled to the bus 806, transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing prototyping and floorplanning for electronic circuit designs, comprising:
   identifying or generating a representation of an electronic design;
   modifying or updating the representation of the electronic design by performing at least one change to a circuit component in the representation;
   performing, at a distance-based module that is stored at least partially in memory and functions in conjunction with at least one micro-processor, a first timing or congestion analysis with distance-based timing information for the electronic design during or after modifying or updating the representation, wherein
      the first timing or congestion analysis includes a distance-based analysis that analyzes the electronic design using one or more constraints having a spatial dimension, instead of temporal dimensions, and
      the distance-based timing information includes at least one slack associated with a net and expressed in the spatial dimension rather than in the temporal dimensions regardless of whether the net has been created in the representation; and
   generating results for the first timing or congestion analysis.

2. The computer implemented method of claim 1, the act of identifying or generating the representation further comprising:
   reducing a size of the electronic design to generate an abstracted version of the electronic design to create the representation by using one or more model reduction techniques; and
   performing placement or floorplanning to place one or more component models in the representation.

3. The computer implemented method of claim 2, wherein the representation of the electronic design or the one or more component models include one or more flexmodels of designs or one or more gate level designs of one or more corresponding circuit components.

4. The computer implemented method of claim 1, the act of generating the results comprising at least one of:
   providing the results for the first timing or congestion analysis interactively while the circuit component is being moved in the representation; and
   providing the results for the first timing or congestion analysis in a batch mode.

5. The computer implemented method of claim 1, the process further comprising:
   characterizing the representation of the electronic design; and
   identifying or determining a correlation or mapping between timing information having a temporal dimension and the distance-based timing information having the spatial dimension.

6. The computer implemented method of claim 5, the act of characterizing the representation comprising:
   identifying an component pair including a first component model and a second component model in the representation; and
   identifying or determining a first path between the first component model and the second component model based at least in part upon the timing information associated with the first path.

7. The computer implemented method of claim 6, wherein the timing information includes a smallest available slack for the first path.

8. The computer implemented method of claim 6, the act of characterizing the representation further comprising:
   generating or updating a distance-based timing graph for the electronic design, wherein
      the distance-based timing graph includes a first node representing the first component, a second node representing the second component model, and a first edge representing the first path,
      the first edge in the distance-based timing graph is associated with a distance value between the first component model and the second component value, and
      the distance value is derived from the timing information having the temporal dimension using the correlation or mapping.

9. The computer implemented method of claim 8, wherein the distance value is derived from the timing information based at least in part upon a first internal distance margin of the first component model or a second internal distance margin of the second component model.

10. The computer implemented method of claim 6, the act of characterizing the representation further comprising:
    identifying or determining a maximum allowable distance for constraining the first path based at least in part upon the timing information associated with the first path.

11. The computer implemented method of claim 10, the act of characterizing the representation further comprising:
    identifying a first register in the first component model and a second register in a second component model;
    identifying or creating a first bounding box for the first component model and a second bounding box for the second component model.

12. The computer implemented method of claim 10, wherein the maximum allowable distance is identified or determined based further at least in part upon a first area of the first component model or the first bounding box or a second area of the second component model or the second bounding box.

13. The computer implemented method of claim 1, the process further comprising:
    identifying or determining routing information for the representation, wherein the routing information includes global route information, C-route (conduit-route) information, or detail route information for at least a portion of the representation;
updating the distance-based timing information with the routing information; and
performing a second timing or congestion analysis with the distance-based timing information for the electronic design and the routing information.

14. The computer implemented method of claim 6, the act of characterizing the representation further comprising:
determining whether or not the first path passes through a third component model including combination logic block or a block of sequential gates;
determining whether or not the first component model and the second component model is connected with a second path that does not pass through the third component model; and
determining whether or not the first path is to be replaced with the second path based at least in part upon a first length of the first path through the third component model and the second length of the second path.

15. The computer implemented method of claim 6, the act of characterizing the representation further comprising:
determining whether or not the first path passes through a register that is situated at a same hierarchical level as the first component model and the second component model; and
determining whether or not the register is fixed in the representation.

16. The computer implemented method of claim 15, the act of characterizing the representation further comprising:
retiming the first path by moving the register when the register is determined not to be fixed in the representation; and
treating the register as a third component model including a combinational logic block or a block of sequential gates for the first timing or congestion analysis.

17. A computer program product comprising a non-transitory computer accessible storage medium having stored thereupon a sequence of instructions which, when executed by at least one processor executing one or more threads, causes the at least one processor to perform a plurality of acts for implementing prototyping and floorplanning for electronic circuit designs, the plurality of acts comprising:
identifying or generating a representation of an electronic design;
modifying or updating the representation of the electronic design by performing at least one change to a circuit component in the representation;
performing, at a distance-based module that is stored at least partially in memory and functions in conjunction with at least one micro-processor, a first timing or congestion analysis with distance-based timing information for the electronic design during or after modifying or updating the representation, wherein
the first timing or congestion analysis includes a distance-based analysis that analyzes the electronic design using one or more constraints having a spatial dimension, instead of temporal dimensions, and
the distance-based timing information includes at least one slack associated with a net and expressed in the spatial dimension rather than in the temporal dimensions regardless of whether the net has been created in the representation; and
generating results for the timing or congestion analysis.

18. The computer program product of claim 17, the act of characterizing the representation comprising:
identifying an component pair including a first component model and a second component model in the representation; and
identifying or determining a first path between the first component model and the second component model based at least in part upon the timing information associated with the first path.

19. The computer program product of claim 18, the act of characterizing the representation further comprising:
determining whether or not the first path passes through a third component model including combination logic block or a block of sequential gates;
determining whether or not the first component model and the second component model is connected with a second path that does not pass through the third component model; and
determining whether or not the first path is to be replaced with the second path based at least in part upon a first length of the first path through the third component model and the second length of the second path.

20. The computer program product of claim 18, the act of characterizing the representation further comprising:
determining whether or not the first path passes through a register that is situated at a same hierarchical level as the first component model and the second component model; and
determining whether or not the register is fixed in the representation.

21. The computer program product of claim 20, the act of characterizing the representation further comprising:
retiming the first path by moving the register when the register is determined not to be fixed in the representation; and
treating the register as a third component model including a combinational logic block or a block of sequential gates for the first timing or congestion analysis.

22. The computer program product of claim 17, the plurality of acts further comprising:
identifying or determining routing information for the representation, wherein the routing information includes global route information, C-route (conduit-route) information, or detail route information for at least a portion of the representation;
updating the distance-based timing information with the routing information; and
performing a second timing or congestion analysis with the distance-based timing information for the electronic design and the routing information.

23. A system for implementing prototyping and floorplanning for electronic circuit designs, comprising:
non-transitory memory storing thereupon program code storing thereupon a sequence of instructions;
a processor or processor core executing one or more threads of a computing system, wherein the processor or processor core executes the sequence of instructions at least to:
identify or generate a representation of an electronic design;
modify or update the representation of the electronic design by performing at least one change to a circuit component in the representation;
perform a first timing or congestion analysis with distance-based timing information for the electronic design during or after modifying or updating the representation, wherein the first timing or congestion analysis includes a distance-based analysis that analyzes the electronic design using one or more constraints having a spatial dimension, instead of temporal dimensions, and the distance-based timing information includes at least one slack associated with a net and expressed in the spatial dimension rather than in the temporal dimensions regardless of whether the net has been created in the representation; and generate results for the first timing or congestion analysis.

24. The system of claim 23, wherein the processor or processor core further executes the sequence of instructions to identify an component pair including a first component model and a second component model in the representation; and identify or determine a first path between the first component model and the second component model based at least in part upon the timing information associated with the first path.

25. The system of claim 24, wherein the processor or processor core further executes the sequence of instructions to determine whether or not the first path passes through a third component model including combination logic block or a block of sequential gates; determine whether or not the first component model and the second component model is connected with a second path that does not pass through the third component model; and determine whether or not the first path is to be replaced with the second path based at least in part upon a first length of the first path through the third component model and the second length of the second path.

26. The system of claim 24, wherein the processor or processor core further executes the sequence of instructions to determine whether or not the first path passes through a register that is situated at a same hierarchical level as the first component model and the second component model; and determine whether or not the register is fixed in the representation.

27. The system of claim 26, wherein the processor or processor core further executes the sequence of instructions to retime the first path by moving the register when the register is determined not to be fixed in the representation; and treating the register as a third component model including a combinational logic block or a block of sequential gates for the first timing or congestion analysis.

28. The system of claim 23, wherein the processor or processor core further executes the sequence of instructions to identify or determine routing information for the representation, wherein the routing information includes global route information, C-route (conduit-route) information, or detail route information for at least a portion of the representation; update the distance-based timing information with the routing information; and perform a second timing or congestion analysis with the distance-based timing information for the electronic design and the routing information.

* * * * *